US012499742B2

(12) United States Patent
Cox et al.

(10) Patent No.: US 12,499,742 B2
(45) Date of Patent: Dec. 16, 2025

(54) SAFETY SYSTEM, ARTICLE OF PERSONAL PROTECTIVE EQUIPMENT, AND METHOD

(71) Applicant: 3M INNOVATIVE PROPERTIES COMPANY, St. Paul, MN (US)

(72) Inventors: Andrew A. S. Cox, Indian Trail, NC (US); Matthew Shannon, Salisbury, NC (US); Richard J. Sabacinski, Charlotte, NC (US); Wesley M. Barbee, Oxboro, NC (US); Craig M. Parkulo, Midland, NC (US); Darin K. Thompson, Huntersville, NC (US)

(73) Assignee: 3M Innovative Properties Company, St. Paul, MN (US)

( * ) Notice: Subject to any disclaimer, the term of this patent is extended or adjusted under 35 U.S.C. 154(b) by 98 days.

(21) Appl. No.: 18/283,380

(22) PCT Filed: Mar. 14, 2022

(86) PCT No.: PCT/IB2022/052287
§ 371 (c)(1),
(2) Date: Sep. 21, 2023

(87) PCT Pub. No.: WO2022/200911
PCT Pub. Date: Sep. 29, 2022

(65) Prior Publication Data

US 2024/0296722 A1 Sep. 5, 2024

Related U.S. Application Data

(60) Provisional application No. 63/165,957, filed on Mar. 25, 2021.

(51) Int. Cl.
*G08B 23/00* (2006.01)
*G08B 6/00* (2006.01)
*G08B 21/04* (2006.01)

(52) U.S. Cl.
CPC ........... *G08B 6/00* (2013.01); *G08B 21/0453* (2013.01)

(58) Field of Classification Search
CPC ...... G08B 6/00; G08B 21/0453; G08B 21/02; A62B 18/08; A62B 35/0025
See application file for complete search history.

(56) References Cited

U.S. PATENT DOCUMENTS 8,085,144 B2 * 12/2011 Appelt ................. A61B 5/6814 128/204.23
8,228,202 B2 7/2012 Buchner et al.
(Continued)

OTHER PUBLICATIONS

Gleveckas-Martens, "Somatosensory System Anatomy", 2013, Medscape, URL: <https://emedicine.medscape.com/article/1948621-print>, pp. 1-6.
Gomez-Ramirez, "Neural Mechanisms of Selective Attention in the Somatosensory System", 2016, Journal of Neurophysiology, vol. 116 No. 3, pp. 1218-1231.
(Continued)

*Primary Examiner* — Toan N Pham

(57) ABSTRACT

A safety system for a user includes an article of personal protective equipment (PPE) configured to be at least partially in contact with the user. The safety system further includes at least one tactile actuator and a controller. The at least one tactile actuator is associated with the article of PPE. The at least one tactile actuator is configured to provide tactile stimulation to the user. The controller is communicably coupled to the at least one tactile actuator. The controller is configured to provide an actuating signal to the at least one tactile actuator to actuate the at least one tactile actuator based upon at least one predetermined condition. The at least one tactile actuator generates a tactile indication upon receiving the actuating signal.

19 Claims, 14 Drawing Sheets

(56) References Cited

U.S. PATENT DOCUMENTS

| | | | | |
|---|---|---|---|---|
| 11,291,255 | B2 * | 4/2022 | Kanukurthy | G06K 19/06065 |
| 2005/0114154 | A1 * | 5/2005 | Wolkowicz | G06Q 30/02<br>340/539.12 |
| 2008/0302360 | A1 * | 12/2008 | Chambers | A62B 9/006<br>128/202.13 |
| 2011/0268300 | A1 * | 11/2011 | DeMers | H04R 5/02<br>340/407.1 |
| 2017/0372216 | A1 | 12/2017 | Awiszus et al. | |
| 2018/0122205 | A1 | 5/2018 | Mujeeb | |
| 2018/0301012 | A1 | 10/2018 | Carlson et al. | |
| 2019/0037934 | A1 | 2/2019 | Swank et al. | |
| 2019/0122517 | A1 | 4/2019 | Kimura et al. | |
| 2020/0000377 | A1 | 1/2020 | Ly et al. | |
| 2020/0306567 | A1 * | 10/2020 | Wallace | A62B 18/025 |
| 2023/0384114 | A1 * | 11/2023 | Kruse | G02B 27/017 |

OTHER PUBLICATIONS

Guichard, "Human Sensitivity to Vibration", 1971, Journal of Sound and Vibration, vol. 15, No. 1, pp. 11-16.

Hancock, "The Handy Guide to Touch", Apr. 1995, Johns Hopkins Magazine, URL: <https://pages.jh.edu/jhumag/495web/touch.html#:~:text=The>, pp. 1-2.

Huang, "Feeling Music: Integration of Auditory and Tactile Inputs in Musical Meter Perception", 2012, Auditory and Tactile Grouping in Meter Perception, vol. 7 No. 10, pp. 1-11.

International Search Report received for PCT International Application No. PCT/IB2022/052287, mailed on Jun. 13, 2022, 4 pages.

Physiopedia, "Trigger Points", 2021, URL: <https://web.archive.org/web/20210419121031/https://www.physio-pedia.com/Trigger_Points>, 5 pages.

* cited by examiner

SAFETY SYSTEM, ARTICLE OF PERSONAL PROTECTIVE EQUIPMENT, AND METHOD

CROSS REFERENCE TO RELATED APPLICATIONS

This application is a national stage filing under 35 U.S.C. 371 of PCT/IB2022/052287, filed Mar. 14, 2022, which claims the benefit of U.S. Provisional Patent Application No. 63/165,957 filed Mar. 25, 2021, the disclosure of which is incorporated by reference in its/their entirety herein.

TECHNICAL FIELD

The present disclosure relates generally to a safety system, an article of personal protective equipment, and a method, and in particular, to a safety system, an article of personal protective equipment, and a method for generating a tactile indication for a user.

BACKGROUND

A personal protective equipment (PPE) may be used to protect a user from injuries and infections. The PPE may provide suitable protection to the user while the user is present in a working environment. The PPE may further provide alerts to the user, e.g., audio and visual notifications, to alert the user of one or more potentially hazardous situations in the working environment.

SUMMARY

In one aspect, the present disclosure provides a safety system for a user. The safety system includes an article of personal protective equipment (PPE). The article of PPE is configured to be at least partially in contact with the user. The safety system further includes at least one tactile actuator associated with the article of PPE. The at least one tactile actuator is configured to provide tactile stimulation to the user. The safety system further includes a controller communicably coupled to the at least one tactile actuator. The controller is configured to provide an actuating signal to the at least one tactile actuator to actuate the at least one tactile actuator based upon at least one predetermined condition. The at least one tactile actuator generates a tactile indication upon receiving the actuating signal.

In another aspect, the present disclosure provides an article of PPE for a user. The article of PPE includes a body configured to at least partially contact the user. The article of PPE further includes at least one tactile actuator associated with the body. The at least one tactile actuator is configured to provide tactile stimulation to the user. The article of PPE further includes a controller communicably coupled to the at least one tactile actuator. The controller is configured to provide an actuating signal to the at least one tactile actuator to actuate the at least one tactile actuator based upon at least one predetermined condition. The at least one tactile actuator generates a tactile indication upon receiving the actuating signal.

In yet another aspect, the present disclosure provides a method of generating a tactile indication. The method includes providing at least one tactile actuator on an article of PPE worn by a user. The method further includes determining at least one predetermined condition. The method further includes providing, by a controller, an actuating signal to the at least one tactile actuator to actuate the at least one tactile actuator upon determining the at least one predetermined condition. The at least one tactile actuator generates a tactile indication upon receiving the actuating signal.

BRIEF DESCRIPTION OF THE DRAWINGS

Exemplary embodiments disclosed herein may be more completely understood in consideration of the following detailed description in connection with the following figures. The figures are not necessarily drawn to scale. Like numerals used in the figures refer to like components. When pluralities of similar elements are present, a single reference numeral may be assigned to each plurality of similar elements with a small letter designation referring to specific elements. When referring to the elements collectively or to a non-specific one or more of the elements, the small letter designation may be eliminated. However, it will be understood that the use of a numeral to refer to a component in a given figure is not intended to limit the component in another figure labeled with the same number.

DETAILED DESCRIPTION

Figure 1:
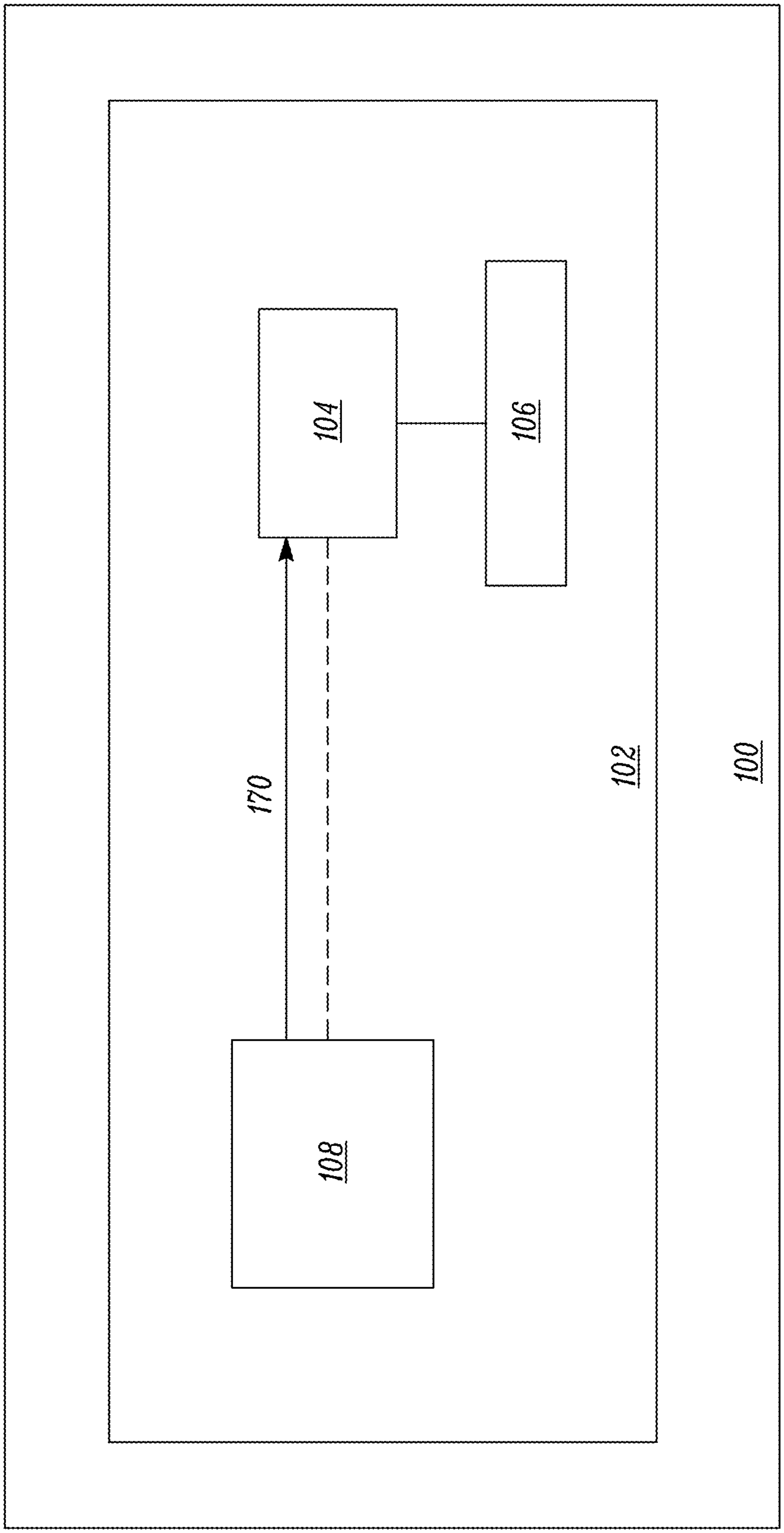
FIG. 1 is a schematic block diagram of a safety system according to an embodiment of the present disclosure.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense. Hereinafter, "at least one of A and B" should be understood to mean "only A, only B, or both A and B".

The present disclosure relates to a safety system for a user. The safety system includes an article of personal protective equipment (PPE). The article of PPE may be worn by a user while working in a working environment.

The article of PPE is configured to be at least partially in contact with the user. The safety system further includes at least one tactile actuator associated with the article of PPE. The at least one tactile actuator is configured to provide tactile stimulation to the user. The safety system further includes a controller communicably coupled to the at least one tactile actuator. The controller is configured to provide an actuating signal to the at least one tactile actuator to actuate the at least one tactile actuator based upon at least one predetermined condition. The at least one tactile actuator generates a tactile indication upon receiving the actuating signal.

Conventional safety systems including an article of PPE may provide protection to the user from various potentially hazardous situations. The conventional safety systems may detect the hazardous situations using various sensors. The conventional safety systems may further generate alerts, such as audio and visual notifications, upon detection of the hazardous situations. However, the alerts provided by the conventional safety systems may not stimulate senses of the user to a level necessary for adequate situational awareness. For example, the conventional safety systems may not stimulate the senses of the user working in the working environment when the visual and audio senses of the user are preoccupied.

The safety system of the present disclosure may provide the tactile indication to the user. The tactile indication may stimulate mechanoreceptors of the user. Therefore, the tactile indication may provide alerts, such as messages, notifications, and instructions to the user. In some cases, the tactile indication may provide operational and assistive indications to the user. The operational and the assistive indications may be indicative of safety related events, and navigation in the working environment.

The tactile indication provided by the safety system of the present disclosure may allow the user to receive the messages, notifications, and instructions even when the visual and audio senses of the user are preoccupied. Therefore, the safety system of the present disclosure may provide improved situational awareness to the user in the working environment. Furthermore, the safety system of the present disclosure may direct the user to a safe area during an emergency (e.g., failure of equipment).

Referring now to the figures, FIG. 1 illustrates a schematic block diagram of a safety system 100 for a user according to an embodiment of the present disclosure. The safety system 100 includes an article of personal protective equipment (PPE) 102 (hereinafter, "the article 102"). The article 102 may be worn by the user while operating or working in a working environment. In some embodiments, the article 102 includes at least one of a self-contained breathing apparatus (SCBA), a powered air-purifying respirator (PAPR), a personal alert safety device, a harness, a full facemask, a half facemask, a belt, and an article of clothing.

The article 102 is configured to be at least partially in contact with the user. The safety system 100 further includes at least one tactile actuator 104 associated with the article 102. The at least one tactile actuator 104 is configured to provide tactile stimulation to the user. Specifically, the at least one tactile actuator 104 may stimulate mechanoreceptors of the user. In some embodiments, the at least one tactile actuator 104 may provide the tactile stimulation to the user by vibrating. In other words, the at least one tactile actuator 104 may provide one or more haptic effects to the user. In some embodiments, the at least one tactile actuator 104 vibrates at a frequency ranging from about 200 hertz (Hz) to about 300 Hz.

The at least one tactile actuator 104 may be disposed on, embedded in, and/or integrated with the article 102. The at least one tactile actuator 104 may be associated with the article 102 by mechanical attachment. In some cases, the at least one tactile actuator 104 may be associated with the article 102 by embedding the at least one tactile actuator 104 between two layers of textile of the article 102. The at least one tactile actuator 104 may be strategically positioned on the article 102 to improve the tactile stimulation provided by the at least one tactile actuator 104 to the user. Furthermore, the at least one tactile actuator 104 may be strategically positioned on the article 102 to avoid trigger points of the user. A trigger point may be defined as a hyperirritable spot, e.g., a palpable nodule in the taut bands of the skeletal muscles' fascia. Direct compression or muscle contraction may elicit jump sign, local tenderness, local twitch response and referred pain which usually responds with a pain pattern distant from the hyperirritable spot.

In the illustrated embodiment of FIG. 1, the safety system 100 includes one tactile actuator 104 associated with the article 102. However, in some other embodiments, the safety system 100 may include more than one of the tactile actuator 104 associated with the article 102.

The safety system 100 further includes a controller 108 communicably coupled to the at least one tactile actuator 104. The controller 108 may include a processor, and a memory that stores a program, which when executed by the controller 108 causes the processor to perform the functions described herein. In addition to a traditional processor and a memory, the controller 108 may include integrated circuitry for processing and/or control, e.g., one or more processors and/or processor cores and/or Field Programmable Gate Array (FPGAs) and/or Application Specific Integrated Circuitry (ASICs). The controller 108 may be configured to access (e.g., write to and/or reading from) memory, which may include any kind of volatile and/or non-volatile memory, e.g., cache and/or buffer memory and/or Random Access Memory (RAM) and/or Read-Only Memory (ROM) and/or optical memory and/or Erasable Programmable Read-Only Memory (EPROM). Such memory may be configured to store code executable by the controller 108 and/or other data, e.g., data pertaining to communication, configuration and/or address data of nodes, etc.

In some embodiments, the controller 108 is disposed on the article 102. However, in some other embodiments, the controller 108 may be located remotely from the article 102. The controller 108 may be communicably coupled to the at least one tactile actuator 104 wirelessly, and/or via a wired connection. Specifically, in some embodiments, the controller 108 is wirelessly coupled to the at least one tactile actuator 104. In some other embodiments, the controller 108 is communicably coupled to the at least one tactile actuator 104 via a wired connection. In some other embodiments, the controller 108 is communicably coupled to the at least one tactile actuator 104 via a combination of wireless and wired connections.

In some embodiments, the controller 108 may be further configured to communicate with one or more external systems (not shown in FIG. 1). The controller 108 may use any suitable communication protocol and technology for communication with the one or more external systems. For example, the controller 108 may communicate with the one or more external systems via Transmission Control Protocol/Internet Protocol (TCP/IP). In another example, the controller 108 may communicate with the one or more external systems via Bluetooth®. Furthermore, WiFi, WiMax or cellular technologies, e.g., Long Term Evolution (LTE), may be used in addition to, or in lieu of traditional long/medium range wireless communication technologies.

The controller 108 is configured to provide an actuating signal 170 to the at least one tactile actuator 104 to actuate the at least one tactile actuator 104 based upon at least one predetermined condition. The at least one predetermined condition may include a parameter associated with the article 102 and the working environment of the user. The at least one tactile actuator 104 generates a tactile indication upon receiving the actuating signal 170.

The tactile indication may provide alerts, such as messages, notifications, and instructions to the user. In some cases, the tactile indication may include a combination of different types of vibrations and haptic effects. Each type of vibration or haptic effect may have a distinct vibration pattern. Further, each type of vibration may be indicative of a specific predetermined condition from multiple predetermined conditions. As discussed above, the controller 108 may be configured to communicate with the one or more external systems. The controller 108 may receive a data packet from a remote device or other instructing device. The data packet may include a predetermined message. After receiving the data packet, the controller 108 may decode the data packet into the actuating signal 170.

In the illustrated embodiment of FIG. 1, the safety system 100 further includes a power source 106 configured to supply an electrical power to the at least one tactile actuator 104. In some embodiments, the power source 106 may be disposed on the article 102. However, in some embodiments, the power source 106 may be an onboard power source of the at least one tactile actuator 104.

The power source 106 may include, for example, a battery. Examples of the battery may include coin cells, Lithium Ion batteries, and the like. In some embodiments, the battery may be rechargeable. A rechargeable battery, such as a Lithium Ion battery, may provide a compact and long-life source of power.

In some embodiments, the power source 106 may supply the electrical power to the at least one tactile actuator 104 via a wired connection. However, in some other embodiments, the power source 106 may supply the electrical power to the at least one tactile actuator 104 wirelessly. For example, the power source 106 may include a transmitter coil (not shown), and the at least one tactile actuator 104 may include a receiver coil (not shown). The power source 106 may supply the electrical power to the at least one tactile actuator 104 via magnetic induction between the transmitter coil of the power source 106 and the receiver coil of the at least one tactile actuator 104.

Figure 2:
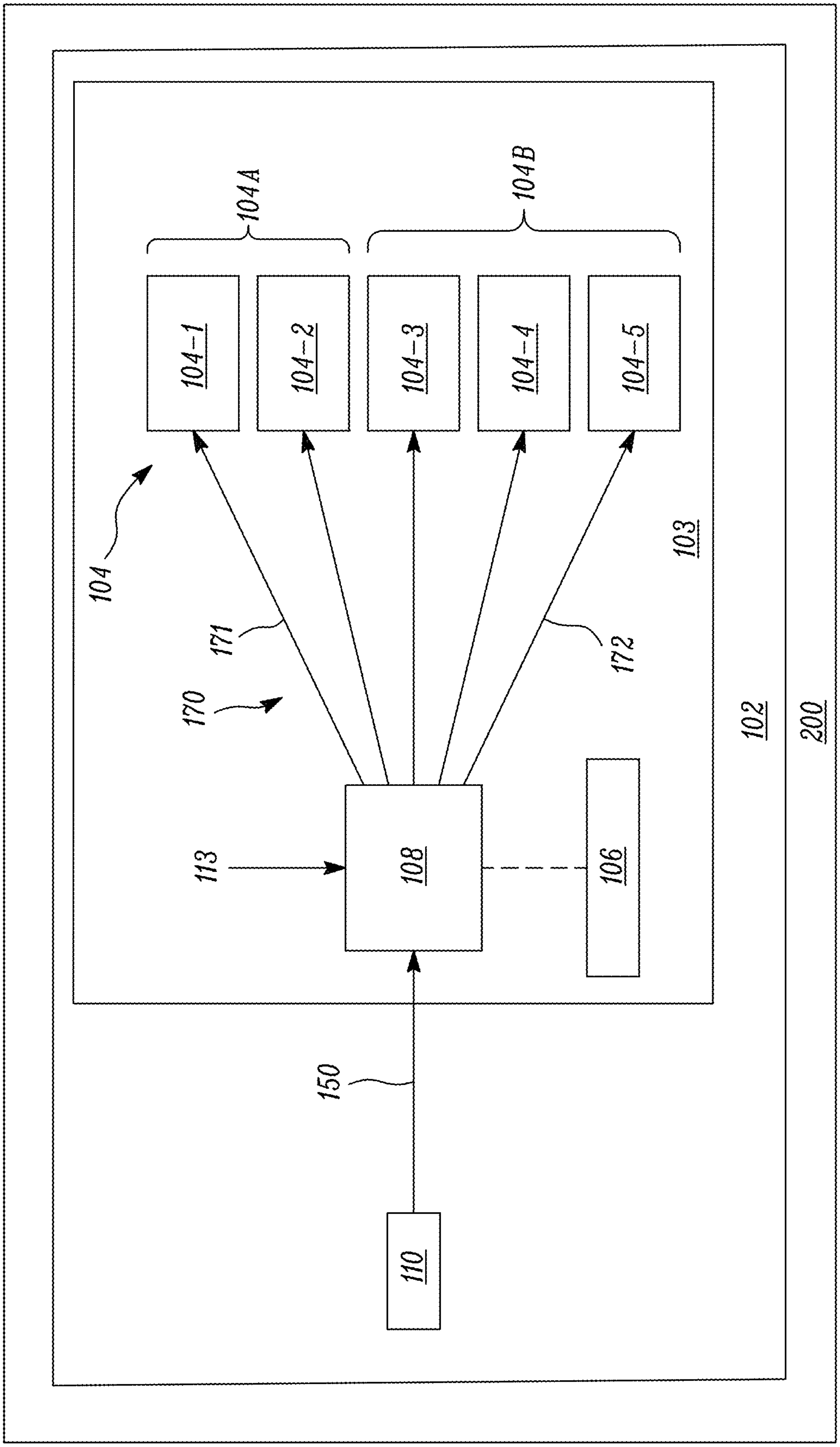
FIG. 2 is a schematic block diagram of a safety system according to another embodiment of the present disclosure.

FIG. 2 illustrates a schematic block diagram of a safety system 200 according to another embodiment of the present disclosure. The safety system 200 is equivalent to the safety system 100 shown in FIG. 1, with like elements designated by like numerals.

The safety system 200 includes the article 102. In the illustrated embodiment of FIG. 2, the article 102 for the user further includes a body 103 configured to at least partially contact the user. The article 102 further includes the at least one tactile actuator 104. The at least one tactile actuator 104 is associated with the body 103.

In the illustrated embodiment of FIG. 2, the at least one tactile actuator 104 includes a plurality of tactile actuators 104-1, 104-2, 104-3, 104-4, 104-5 (collectively, tactile actuators 104) spaced apart from each other. Furthermore, the plurality of tactile actuators 104 is communicably coupled to the controller 108. In other words, each tactile actuator 104 from the plurality of tactile actuators 104 is communicably coupled to the controller 108.

Specifically, in the illustrated embodiment of FIG. 2, the plurality of tactile actuators 104 includes a first tactile actuator 104-1, a second tactile actuator 104-2, a third tactile actuator 104-3, a fourth tactile actuator 104-4, and a fifth tactile actuator 104-5. The first, second, third, fourth, and fifth tactile actuators 104-1, 104-2, 104-3, 104-4, 104-5 are spaced apart from each other. Further, each of the first, second, third, fourth, and fifth tactile actuators 104-1, 104-2, 104-3, 104-4, 104-5 is communicably coupled to the controller 108.

The plurality of tactile actuators 104 may be disposed on, embedded in, and/or integrated with the body 103 of the article 102. The plurality of tactile actuators 104 may be strategically positioned on the body 103 of the article 102 to improve the tactile stimulation provided by the plurality of tactile actuators 104 to the user. Moreover, the plurality of tactile actuators 104 may be strategically positioned on the body 103 to avoid the trigger points of the user.

Figure 3A:
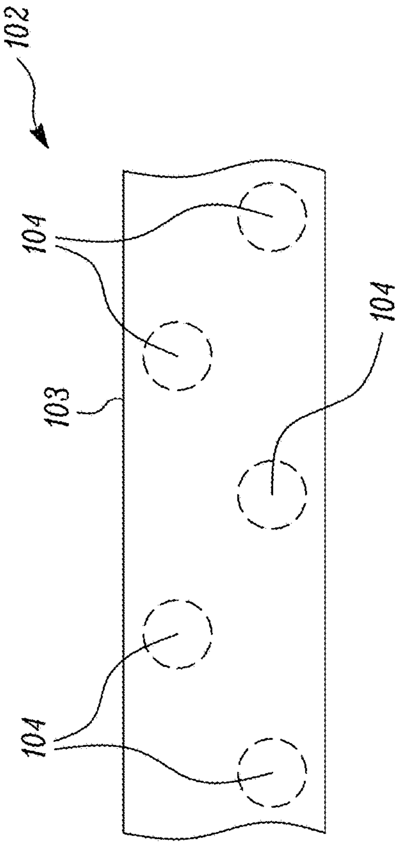
FIG. 3A is a schematic plan view of an article of PPE according to an embodiment of the present disclosure.

FIG. 3A illustrates a schematic plan view of the article 102 including the body 103 according to an embodiment of the present disclosure. In the illustrated embodiment of FIG. 3A, the body 103 of the article 102 may include a strap. As shown in FIG. 3A, in some embodiments, the plurality of tactile actuators 104 is associated with the article 102 in a zig-zag pattern. Specifically, in some embodiments, the plurality of tactile actuators 104 is associated with the body 103 in the zig-zag pattern. However, the plurality of tactile actuators 104 may be associated with the article 102 and the body 103 in any other pattern, as per desired application attributes. For example, in some embodiments, the plurality of tactile actuators 104 may be associated with the article 102 and the body 103 in a staggered pattern different from the zig-zag pattern.

Referring back to FIG. 2, in some embodiments, the article 102 may include two or more subsets of the plurality of tactile actuators 104. In the illustrated embodiment of FIG. 2, the article 102 further includes a first subset 104A and a second subset 104B of the plurality of tactile actuators 104. Specifically, the first subset 104A includes the first and second tactile actuators 104-1, 104-2. Furthermore, the second subset 104B includes the third, fourth, and fifth tactile actuators 104-3, 104-4, 104-5. The plurality of tactile actuators 104 of the first and second subsets 104A, 104B may be positioned at different locations on the body 103. For example, the first subset 104A may be disposed on a left portion of the body 103, and the second subset 104B may be disposed on a right portion of the body 103.

Moreover, in the illustrated embodiment of FIG. 2, the article 102 further includes the controller 108 communicably coupled to the plurality of tactile actuators 104. In the illustrated embodiment of FIG. 2, the controller 108 is disposed on the body 103. However, in some other embodiments, controller 108 may be located remotely from the body 103.

In some embodiments, the article 102 further includes the power source 106. In some embodiments, the controller 108 is communicably coupled to the power source 106. In some embodiments, the controller 108 is further configured to control the electrical power supplied to the at least one tactile actuator 104. In some embodiments, the controller 108 may be configured to control the electrical power supplied to each of the plurality of tactile actuators 104. Specifically, the controller 108 may supply a different magnitude of the electrical power to each of the plurality of tactile actuators 104, as per desired application attributes.

Furthermore, at least one tactile actuator 104 from the plurality of tactile actuators 104 generates the tactile indication upon receiving the actuating signal 170. In some embodiments, the controller 108 may provide a corresponding actuating signal 170 to each of the plurality of tactile actuators 104. Specifically, the controller 108 may provide a first actuating signal 171 to one or more of the plurality of tactile actuators 104. Further, the controller 108 may provide a second actuating signal 172 to one or more of the plurality of tactile actuators 104. The second actuating signal 172 may be different from the first actuating signal 171. In FIG. 2, the controller 108 is shown to provide the first actuating signal 171 to the first tactile actuator 104-1 and the second actuating signal 172 to the fifth tactile actuator 104-5 for illustrative purposes only. It may be noted that the controller 108 may provide the first and second actuating signals 171, 172 to one or more of the plurality of tactile actuators 104.

In some embodiments, the controller 108 is further configured to provide the first actuating signal 171 to the first tactile actuator 104-1 from the plurality of tactile actuators 104 to generate a first tactile indication. In some embodiments, the controller 108 is further configured to determine a response of the user to the first tactile indication. In some embodiments, the controller 108 is further configured to provide the second actuating signal 172 to each of the plurality of tactile actuators 104 to generate a second tactile indication upon determining that the response of the user to the first tactile indication includes an incorrect response. The incorrect response may include, for example, no response to the first tactile indication from the user. The incorrect response may also include any non-conforming or unexpected response to the first tactile indication. In some embodiments, the controller 108 may continuously actuate each of the plurality of tactile actuators 104 till the user acknowledges and responds to the second tactile indication.

In the illustrated embodiment of FIG. 2, the safety system 200 further includes at least one sensor 110 communicably coupled to the controller 108. In some embodiments, the article 102 further includes the at least one sensor 110 communicably coupled to the controller 108. In some embodiments, the controller 108 is wirelessly coupled to the at least one sensor 110. In some other embodiments, the controller 108 is communicably coupled to the at least one sensor 110 via a wired connection. In some other embodiments, the controller 108 is communicably coupled to the at least one sensor 110 via a combination of wireless and wired connections. In some embodiments, the at least one sensor 110 may include a plurality of sensors 110. Each of the plurality of sensors 110 may be configured to determine a parameter indicative of the at least one predetermined condition.

Figure 3B:
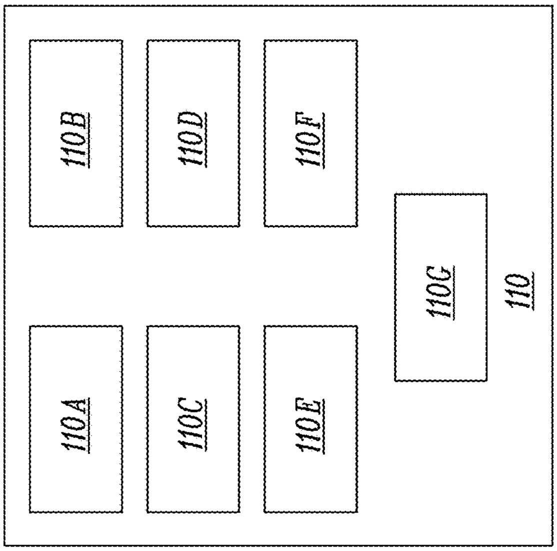
FIG. 3B is a schematic block diagram illustrating different types of sensors according to an embodiment of the present disclosure.

Referring to FIGS. 2 and 3B, in some embodiments, the at least one sensor 110 includes at least one of a temperature sensor 110A, a pressure sensor 110B, a motion sensor 110C, a gyroscope 110D, an accelerometer 110E, an electrochemical sensor 110F, and an electronic battery sensor (EBS) 110G. The controller 108 is further configured to receive an input signal 150 from the at least one sensor 110 indicative of the at least one predetermined condition. Moreover, the controller 108 is further configured provide the actuating signal 170 to the at least one tactile actuator 104 to generate the tactile indication based on the at least one predetermined condition. In some embodiments, the controller 108 may be further configured provide the actuating signal 170 to the plurality of tactile actuators 104 to generate the tactile indication based on the at least one predetermined condition.

In some embodiments, the at least one predetermined condition includes an ambient temperature of the working environment exceeding a threshold temperature. The ambient temperature of the working environment may be determined by the temperature sensor 110A. In some embodiments, the at least one predetermined condition includes reduction of a fluid pressure within a cylinder below a threshold pressure level. The fluid pressure within the cylinder may be determined by the pressure sensor 110B. For example, the at least one predetermined condition may include reduction of a fluid pressure of oxygen/air within an oxygen/air cylinder of the article 102 below a threshold pressure (e.g., 25% of a maximum pressure of the oxygen/air cylinder). In some embodiments, the at least one predetermined condition includes reduction of a battery charge of a battery module below a threshold charge level. For example, the at least one predetermined condition may include reduction of the battery charge of the battery module below 10% of a total battery charge. The battery charge of the battery module may be determined by the EBS 110G.

In some embodiments, the at least one predetermined condition includes detection of a hazardous situation in the working environment. The hazardous situation in the working environment may refer to, for example, presence of a toxic gas above a predefined level in the working environment. Presence of the toxic gas above the predefined level in the working environment may be detected by the electrochemical sensor 110F. In another example, the hazardous situation refers to presence of a radioactivity level in the working environment above a predefined level. In some embodiments, the at least one sensor 110 may monitor an environment parameter of the working environment of the user. In some embodiments, the environment parameter includes at least one of the ambient temperature of the working environment and a concentration of the hazardous gas in the working environment.

In some embodiments, the at least one predetermined condition includes an alert signal from an external device. In some cases, the alert signal from the external device may instruct the user of the article 102 to exit the working environment. In some other cases, the alert signal from the external device may instruct the user of the article 102 to provide help to another user in the working environment. The controller 108 may receive the alert signal from the external device and provide the actuating signal 170 to one or more of the plurality of tactile actuators 104. In some embodiments, the external device may include a personal alert safety system (PASS) device. Furthermore, the at least one predetermined condition may include a man down situation of a user of the PASS device.

Figure 3C:
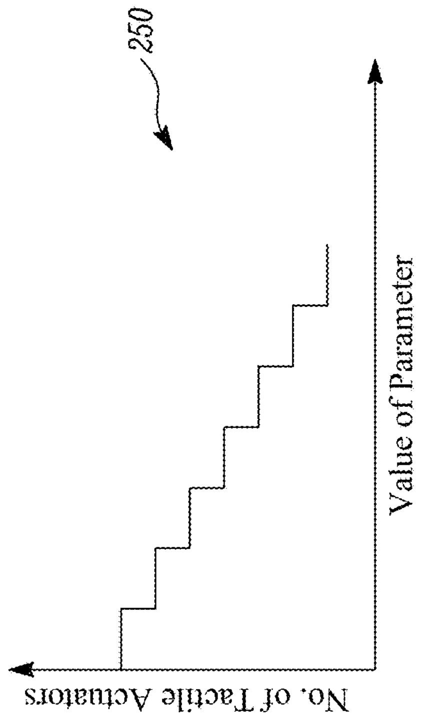
FIG. 3C is a graph illustrating an exemplary variation of a number of a plurality of tactile actuators actuating with respect to a value of a parameter associated with an article of PPE.

In some embodiments, the at least one predetermined condition includes a remaining value of a parameter associated with the article 102. FIG. 3C illustrates a graph 250 illustrating an exemplary variation of a number of the plurality of tactile actuators 104 actuating with respect to a value of the parameter associated with the article 102. Referring to FIGS. 2 and 3C, in some embodiments, the controller 108 is configured to progressively actuate an increasing number of the plurality of tactile actuators 104 based on a decrease in the remaining value of the parameter. In some embodiments, the parameter includes at least one of a fluid pressure within a cylinder and a battery charge of a battery module. In one example, the controller 108 may only actuate the first tactile actuator 104-1 when the battery charge of the battery module is about 50%. Further, the controller 108 may actuate the first and second tactile actuators 104-1, 104-2 when the battery charge of the battery module is about 30%. Moreover, the controller 108 may actuate each of the first, second, third, fourth, and fifth tactile actuators 104-1, 104-2, 104-3, 104-4, 104-5 when the battery charge of the battery module is at about 10%.

Referring back to FIG. 2, in some embodiments, the controller 108 is further configured to receive a navigation instruction 113. In some embodiments, a navigation system may be communicably coupled to the controller 108 to provide the navigation instruction 113 to the controller 108. The navigation system may include, for example, a global positioning system (GPS), a cellular device, a personal digital assistant (PDA) GPS, and a smartphone. The navigation instruction may be received by the controller 108 via Bluetooth® or any suitable communication protocol (e.g., a wireless communication network, such as a wide area network (WAN), a local area network (LAN), or a cloud-based communication network). In some embodiments, the controller 108 is further configured to actuate one or more of the plurality of tactile actuators 104 based on the navigation instruction 113. Furthermore, in some embodiments, the controller 108 is further configured to actuate only a subset (for example, the first subset 104A) of the plurality of tactile actuators 104 to indicate a direction based on the navigation instruction 113.

In some embodiments, the first subset 104A and the second subset 104B of the plurality of tactile actuators 104 may be disposed on a left portion and a right portion of the body 103, respectively. The controller 108 may actuate the plurality of tactile actuators 104 of the first subset 104A to indicate navigation towards a left side of the working environment or the user. Further, the controller 108 may actuate the plurality of tactile actuators 104 of the second subset 104B to indicate navigation towards a right side of the working environment or the user. In some embodiments, the controller 108 may continuously actuate the plurality of tactile actuators 104 till the user acknowledges the navigation instruction 113.

Further, in some embodiments, the controller 108 is further configured to simultaneously actuate each tactile actuator 104 from the plurality of tactile actuators 104 based on an incorrect response to the navigation instruction 113. The incorrect response to the navigation instruction 113 may include no movement, or a movement in a wrong direction by the user with respect to the navigation instruction 113.

Figure 4A:
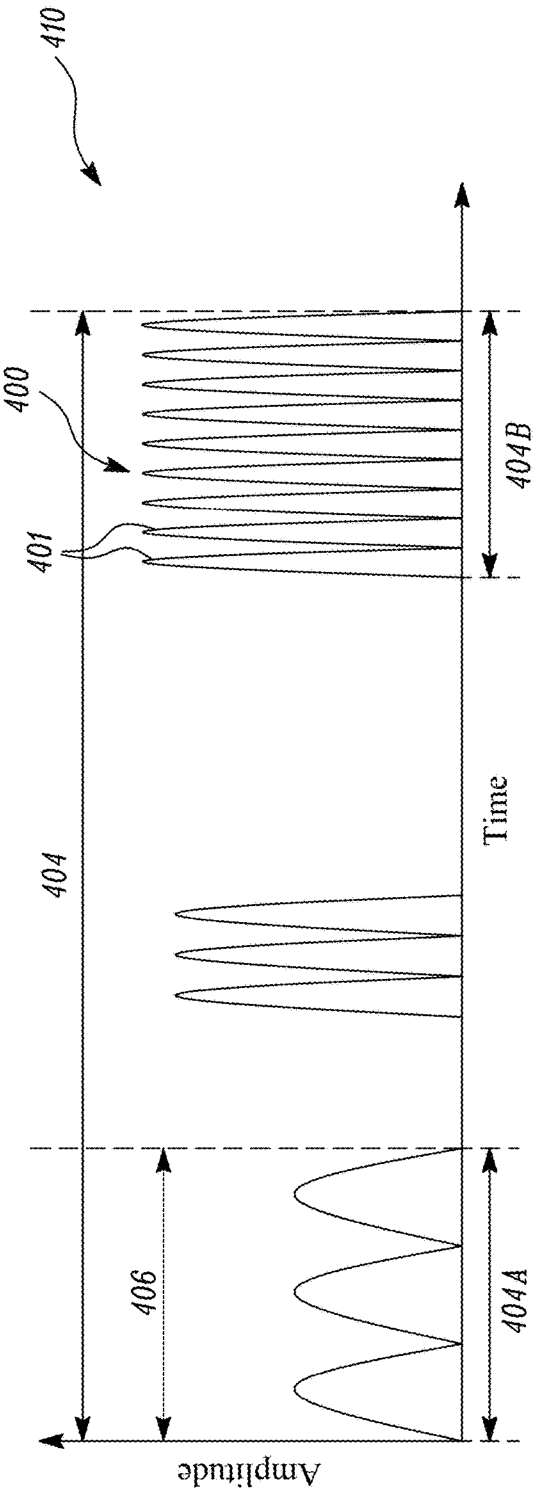
FIG. 4A is a graph illustrating a pulsed signal according to an embodiment of the present disclosure.

In some embodiments, the tactile indication includes a pulsed signal 400 (shown in FIG. 4A) including a plurality of pulses, e.g., pulses 401. FIG. 4A illustrates a graph 410 depicting a variation of an amplitude of the pulsed signal 400 with respect to time according to an embodiment of the present disclosure. In some embodiments, the controller 108 is further configured to regulate at least one parameter of the pulsed signal 400. In some embodiments, the at least one parameter of the pulsed signal 400 includes one or more of an intensity 402 (shown in FIG. 4B), a total time duration 404, a packet duration 406, and a frequency 408 (shown in FIG. 4C). An intensity of the pulsed signal 400 may depend upon a root mean square (RMS) value of the pulsed signal 400.

Referring to FIGS. 2 and 4A-4C, in some embodiments, the controller 108 may regulate each of the intensity 402, the total time duration 404, the packet duration 406, and the frequency 408 of the pulsed signal 400 with respect to the time.

The packet duration 406 may be defined as a duration of a portion the pulsed signal 400 between two time intervals that are substantially devoid of any pulses. In other words, a time interval between two packets of the pulsed signal 400 may correspond to a time duration that is substantially devoid of any pulses. Further, in some cases, the time interval between two packets may be greater than a maximum time period of the pulsed signal 400. The controller 108 may regulate the packet duration 406 of the pulsed signal 400 to provide different haptic effects to the user by the plurality of tactile actuators 104. Further, the controller 108 may regulate the total time duration 404 of the pulsed signal 400. In some embodiments, the total time duration 404 may correspond to a priority of the tactile indication. The pulsed signal 400 may include multiple intensities and frequencies within a given packet duration.

Figure 4B:
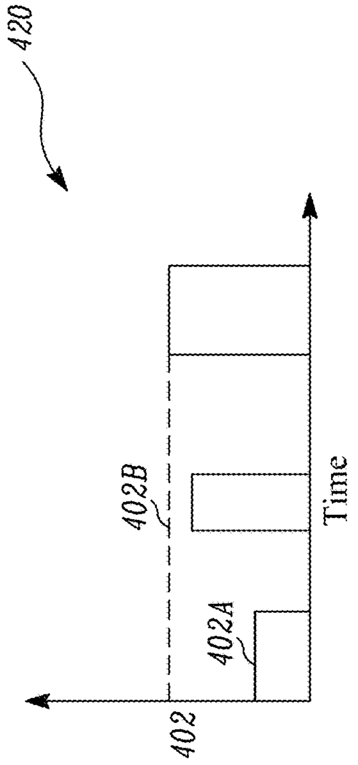
FIG. 4B is a graph illustrating a variation of an intensity of the pulsed signal with respect to time according to an embodiment of the present disclosure.

FIG. 4B illustrates a graph 420 depicting an exemplary variation of the intensity 402 of the pulsed signal 400 with respect to time. The intensity 402 of the pulsed signal 400 may correspond to an intensity of the tactile stimulation provided by the at least one tactile actuator 104 to the user. By varying the intensity of the pulsed signal 400, the controller 108 may regulate the intensity of the tactile indication. In some embodiments, the controller 108 may be configured to increase and decrease the intensity 402 depending on the priority of the tactile indication. In some embodiments, the controller 108 may be configured to increase the intensity 402 of the pulsed signal 400 if the user does not respond to the pulsed signal 400 having a low magnitude of the intensity 402. Further, in some cases (severe alarm conditions), the controller 108 may be configured to increase the intensity 402 of the pulsed signal 400 to a maximum magnitude of the intensity 402.

Figure 4C:
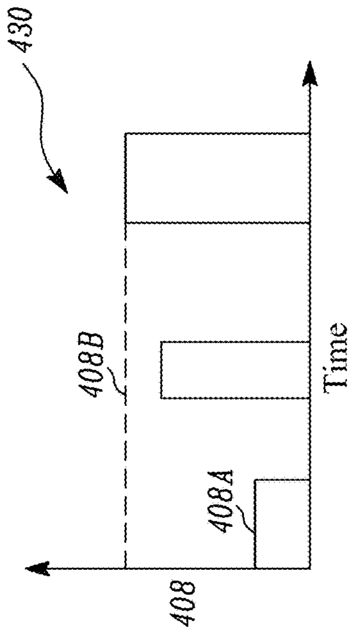
FIG. 4C is a graph illustrating a variation of a frequency of the pulsed signal with respect to time according to an embodiment of the present disclosure.

FIG. 4C illustrates a graph 430 depicting an exemplary variation of the frequency 408 of the pulsed signal 400 with respect to time. By varying the frequency 408 of the pulsed signal 400, the controller 108 may regulate a frequency of the tactile indication. In some embodiments, the controller 108 may be configured to increase and decrease the frequency of the pulsed signal 400 depending on the priority of the tactile indication.

In some embodiments, the controller 108 is further configured to provide the first actuating signal 171 to each of the plurality of tactile actuators 104 to generate a first tactile indication. In some embodiments, the first tactile indication includes a first intensity 402A, a first time duration 404A, and a first frequency 408A. In some embodiments, the controller 108 is further configured to determine a response of the user after providing the first actuating signal 171. In some embodiments, the controller 108 is further configured to provide the second actuating signal 172 to each of the plurality of tactile actuators 104 to generate a second tactile indication upon determining an incorrect response of the user to the first actuating signal 171. In some embodiments, the second tactile indication includes a second intensity 402B, a second time duration 404B, and a second frequency 408B. In some embodiments, at least one of the second intensity 402B, the second time duration 404B, and the second frequency 408B is greater than at least one of the corresponding first intensity 402A, first time duration 404A, and first frequency 408A. In the illustrated embodiment, the second intensity 402B and the second frequency 408B are greater than the first intensity 402A and the first frequency 408A, respectively.

Figure 4E:
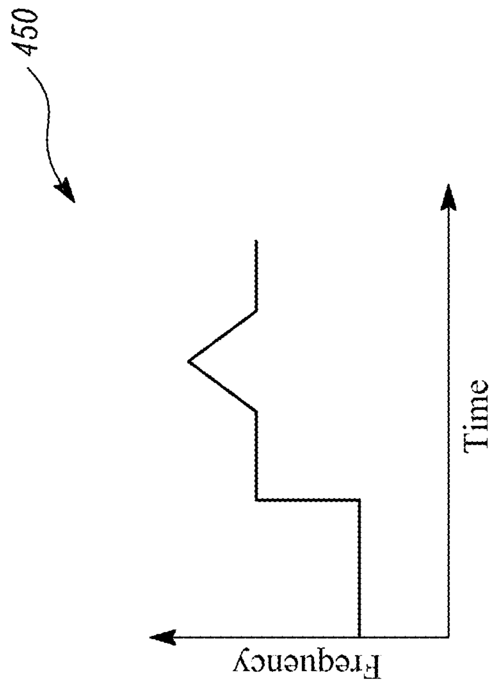
FIG. 4E is a graph illustrating an exemplary variation of a frequency of a pulsed signal with respect to time.
Figure 4D:
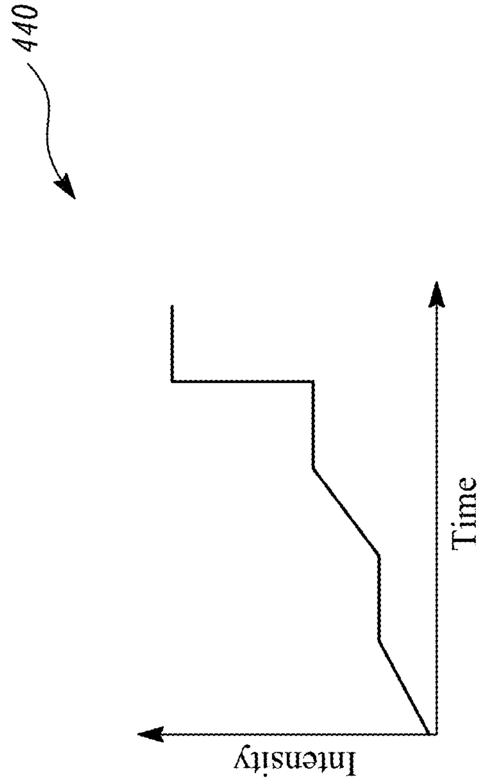
FIG. 4D is a graph illustrating an exemplary variation of an intensity of a pulsed signal with respect to time.

FIGS. 4D and 4E show other exemplary variations of intensity and frequency of another pulsed signal with respect to time. FIG. 4D shows a graph 440 that shows both step-wise and linear variations of intensity with respect to time. Similarly, FIG. 4E shows a graph 450 that shows both step-wise and linear variations of frequency with respect to time. As such, the intensity and frequency may be varied in any suitable manner as per desired application attributes.

Figure 5:
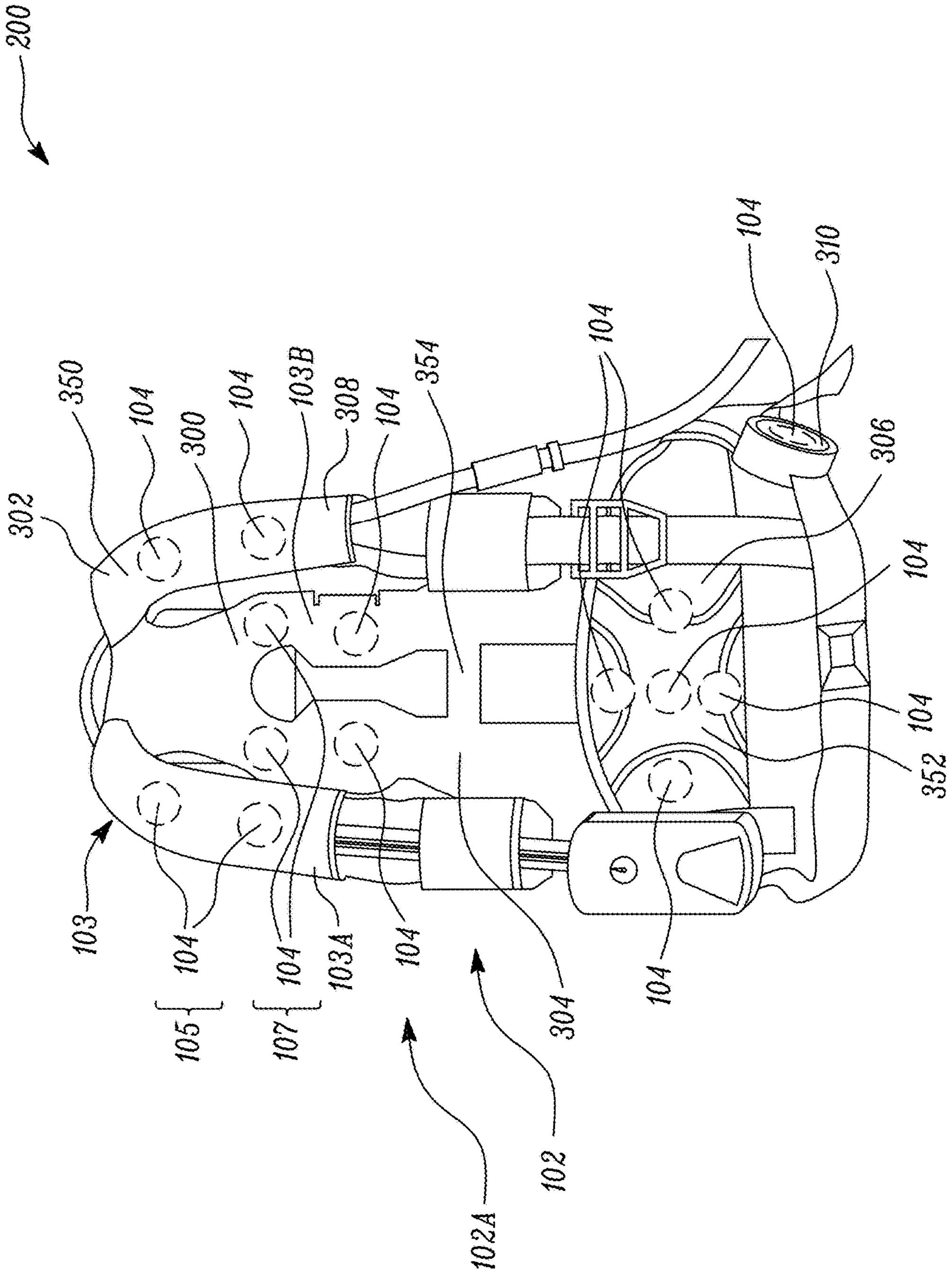
FIG. 5 is a front view of an article of PPE according to an embodiment of the present disclosure.

FIG. 5 illustrates a front view of the safety system 200, according to an embodiment of the present disclosure. Some elements of the safety system 200 shown in FIG. 2 are not shown in FIG. 5 for illustrative purposes. In the illustrated embodiment of FIG. 5, the article 102 includes an SCBA 102A.

In some embodiments, the article 102 includes at least one contact region 300 disposed in direct contact with the user. Specifically, in some embodiments, the body 103 includes the at least one contact region 300 disposed in direct contact with the user. In some embodiments, the at least one tactile actuator 104 is associated with the at least one contact region 300.

In the illustrated embodiment of FIG. 5, the at least one contact region 300 includes a shoulder portion 302, a back portion 304, a waist portion 306, a chest portion 308, and a device portion 310. In some embodiments, the device portion 310 may correspond to a portion of a PASS device. Further, the plurality of tactile actuators 104 is associated with the at least one contact region 300. Specifically, the plurality of tactile actuators 104 is associated with at least one of the shoulder portion 302, the back portion 304, the waist portion 306, the chest portion 308, and the device portion 310.

In some embodiments, the article 102 further includes at least one soft portion 103A at least partially disposed in contact with the user. In some embodiments, the article 102 further includes at least one hard portion 103B at least partially disposed in contact with the user. Specifically, in some embodiments, the body 103 includes the at least one soft portion 103A at least partially disposed in contact with the user. In some embodiments, the body 103 further includes the at least one hard portion 103B at least partially disposed in contact with the user.

A first elastic modulus of the at least one soft portion 103A is less than a second elastic modulus of the at least one hard portion 103B. The at least one soft portion 103A may include a flexible member of the article 102. The at least one hard portion 103B may include a rigid member of the article 102. In some embodiments, the at least one soft portion 103A of the article 102 includes one or more of a shoulder strap 350 and a waist belt 352. Further, in some embodiments, the at least one hard portion 103B of the article 102 includes a back frame 354. Specifically, in some embodiments, the at least one soft portion 103A of the body 103 includes one or more of the shoulder strap 350 and the waist belt 352. Further, in some embodiments, the at least one hard portion 103B of the body 103 includes the back frame 354. In some embodiments, the plurality of tactile actuators 104 includes a first set 105 of tactile actuators 104 associated with the at least one soft portion 103A and a second set 107 of tactile actuators 104 associated with the at least one hard portion 103B.

Figure 6:
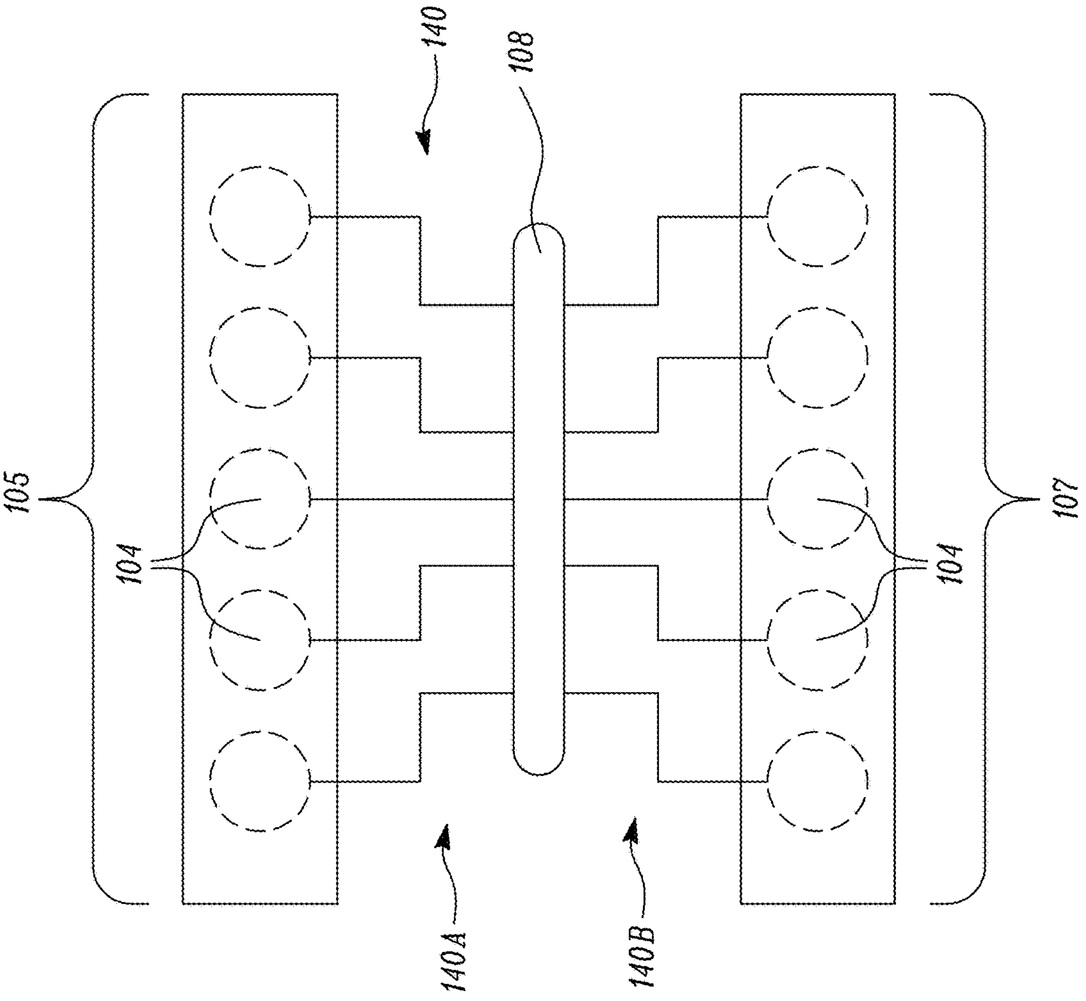
FIG. 6 is a schematic diagram illustrating a connection of a first set and a second set of tactile actuators with a controller according to an embodiment of the present disclosure.

FIG. 6 illustrates a schematic diagram depicting an electrical connection of the first set 105 and the second set 107 of the plurality of tactile actuators 104 with the controller 108. Referring to FIGS. 5 and 6, in some embodiments, the safety system 200 includes a plurality of electrical connections 140. Specifically, in some embodiments, the article 102 includes the plurality of electrical connections 140.

In some embodiments, the safety system 200 further includes a first set 140A of electrical connections 140 electrically connecting the first set 105 of tactile actuators 104 to the controller 108. In some embodiments, the article 102 includes the first set 140A of electrical connections 140 electrically connecting the first set 105 of tactile actuators 104 to the controller 108.

In some embodiments, the safety system 200 further includes a second set 140B of electrical connections 140 electrically connecting the second set 107 of tactile actuators 104 to the controller 108. In some embodiments, the article 102 further includes the second set 140B of electrical connections 140 electrically connecting the second set 107 of tactile actuators 104 to the controller 108. As shown in FIG. 6, the plurality of tactile actuators 104 may be electrically connected in parallel. In some cases, electrically connecting the plurality of tactile actuators 104 in parallel may increase a reliability of the safety system 200 and the article 102.

FIGS. 7A-7F illustrate various embodiments of the article 102. Specifically, in the illustrated embodiment of FIG. 7A, the article 102 includes a half facemask 102B. The half facemask 102B includes the at least one contact region 300. In other words, the body 103 includes the at least one contact region 300. Specifically, the at least one contact region 300 includes a facemask portion 312. Furthermore, the at least one tactile actuator 104 is associated with the facemask portion 312. In some embodiments, the half facemask 102B may further include pockets (not shown) molded in a facemask seal of the half facemask 102B. Further, the at least one tactile actuator 104 may be inserted in the pockets of the half facemask 102B. In some embodiments, the half facemask 102B may further include voicemitter ducts and nosecups. The at least one tactile actuator 104 may be inserted in the voicemitter ducts and the nosecups of the half facemask 102B.

Figure 7A:
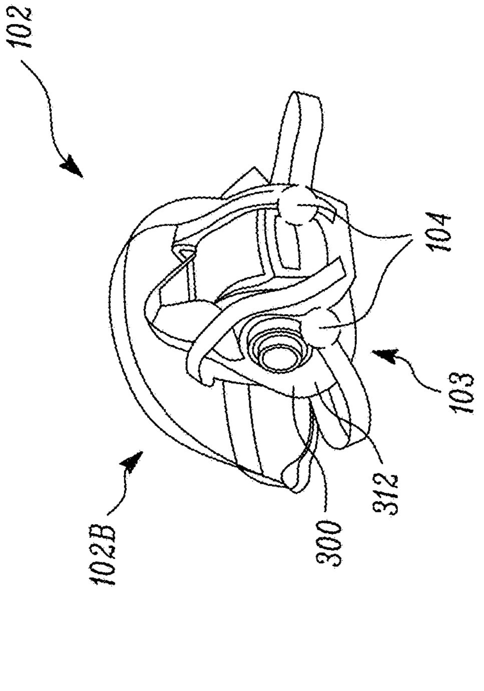
FIGS. 7A-7F illustrate articles of PPE according to various embodiments of the present disclosure.
Figure 7B:
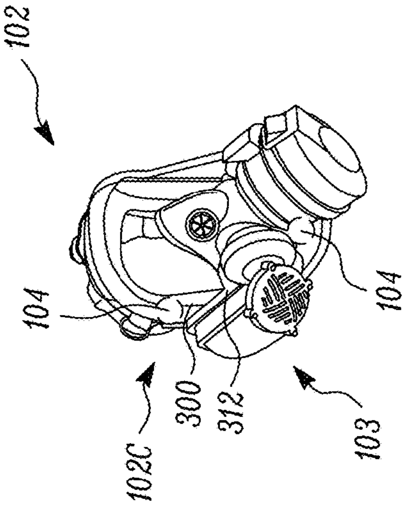

In the illustrated embodiment of FIG. 7B, the article 102 includes a full facemask 102C. The full facemask 102C includes the at least one contact region 300. In other words, the body 103 includes the at least one contact region 300. Specifically, in the illustrated embodiment of FIG. 7B, the at least one contact region 300 includes the facemask portion 312. Furthermore, the at least one tactile actuator 104 is associated with the facemask portion 312. In some embodiments, the full facemask 102C may include pockets (not shown) molded in a facemask seal of the full facemask 102C. Further, the at least one tactile actuator 104 may be inserted in the pockets of the full facemask 102C. In some embodiments, the full facemask 102C may further include voicemitter ducts and nosecups. The at least one tactile actuator 104 may be inserted in the voicemitter ducts and the nosecups of the full facemask 102C.

Figure 7C:
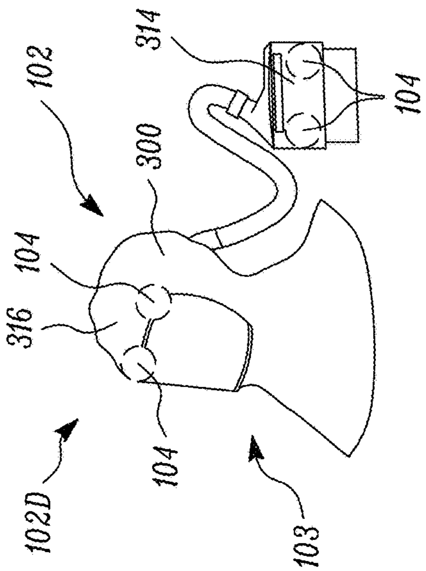

In the illustrated embodiment of FIG. 7C, the article 102 includes a PAPR 102D. The PAPR 102D includes the at least one contact region 300. In other words, the body 103 includes the at least one contact region 300. Specifically, in the illustrated embodiment of FIG. 7C, the at least one contact region 300 includes a facepiece portion 316 and a housing portion 314. In the illustrated embodiment of FIG. 7C, the housing portion 314 corresponds to a portion of a housing of a turbo unit of the PAPR 102D. Furthermore, the at least one tactile actuator 104 is associated with the facepiece portion 316 and the housing portion 314.

Figure 7D:
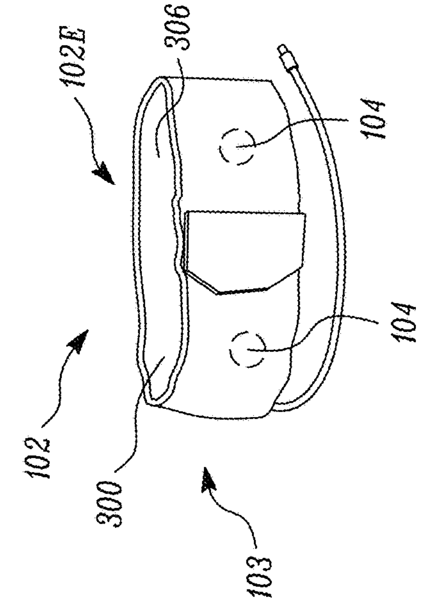

In the illustrated embodiment of FIG. 7D, the article 102 includes a waist belt 102E. The waist belt 102E includes the at least one contact region 300. In other words, the body 103 includes the at least one contact region 300. Specifically, in the illustrated embodiment of FIG. 7D, the at least one contact region 300 includes the waist portion 306. Furthermore, the at least one tactile actuator 104 is associated with the waist portion 306.

Figure 7E:
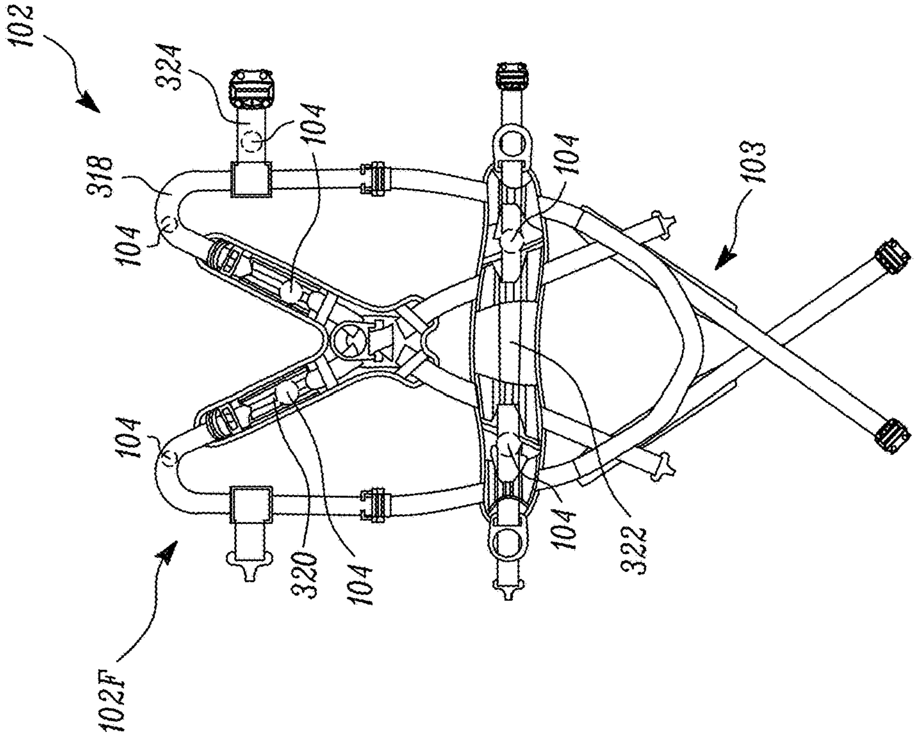

In the illustrated embodiment of FIG. 7E, the article 102 includes a harness 102F. The harness 102F includes at least one of a shoulder strap 318, a back strap 320, a waist strap 322, and a chest strap 324. Further, in some embodiments, the at least one contact region 300 includes at least one of the shoulder strap 318, the back strap 320, the waist strap 322, and the chest strap 324. Furthermore, the at least one tactile actuator 104 is associated with at least one of the shoulder strap 318, the back strap 320, the waist strap 322, and the chest strap 324.

Figure 7F:
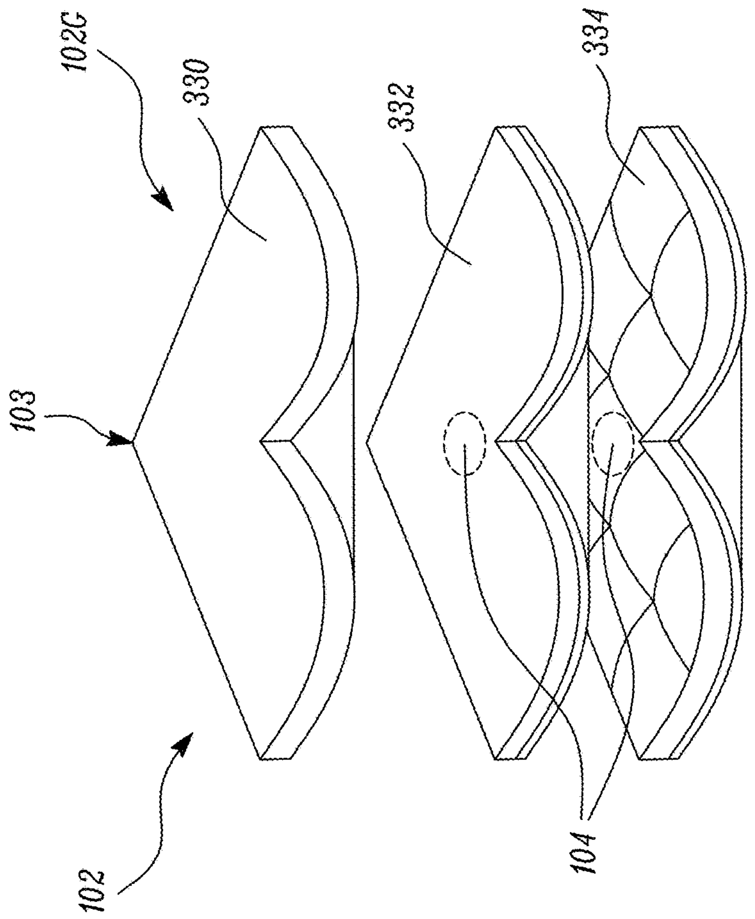

In the illustrated embodiment of FIG. 7F, the article 102 includes a multilayered member 102G. In some embodiments, the at least one tactile actuator 104 is embedded in the multilayered member 102G. In some embodiments, the multilayered member 102G is part of at least one of a strap, a webbing, and an article of clothing.

Furthermore, in some embodiments, the multilayered member 102G includes an outer layer 330, an inner layer 334 contacting the user, and a middle layer 332 disposed between the outer layer 330 and the inner layer 334. The at least one tactile actuator 104 is embedded in at least one of the middle layer 332 and the inner layer 334.

In some embodiments, the outer layer 330 may be an outer shell. The outer shell may provide about 25% of a total thermal protection provided by the multilayered member 102G. Further, in some embodiments, the middle layer 332 is a moisture barrier layer. The moisture barrier layer may provide resistance to water, chemicals and viral agents. In some cases, a breathability of the multilayered member 102G may depend upon a construction of the moisture barrier layer. In some embodiments, the inner layer 334 is a thermal barrier layer. The thermal barrier layer along with the moisture barrier layer may provide 75% of the total thermal protection provided by the multilayered member 102G.

Figure 8:
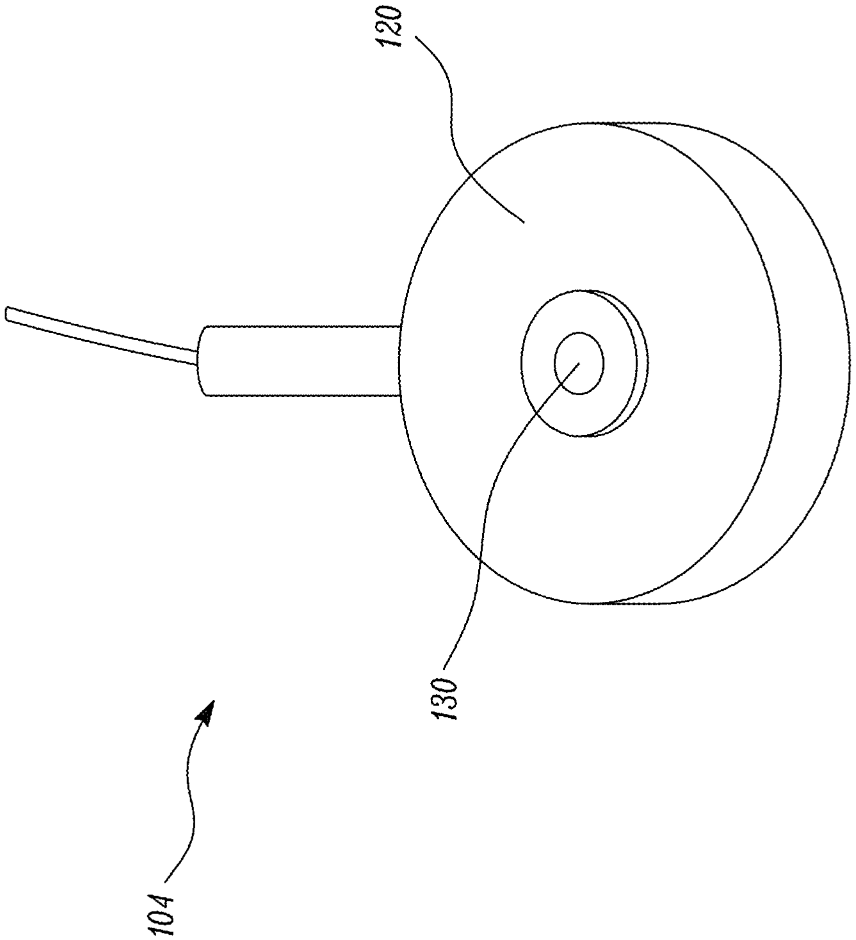
FIG. 8 is a top perspective view of a tactile actuator according to an embodiment of the present disclosure.

FIG. 8 illustrates the tactile actuator 104 according to an embodiment of the present disclosure. In the illustrated embodiment of FIG. 8, the at least one tactile actuator 104 includes a housing 120 and at least one contactor 130 protruding from the housing 120. In some embodiments, the at least one contactor 130 is configured to vibrate relative to the housing 120. In some embodiments, the at least one tactile actuator 104 includes an electromechanical transducer configured to generate the tactile indication. In some embodiments, the at least one tactile actuator 104 may include an eccentric rotating mass (ERM) actuator.

Figure 9A:
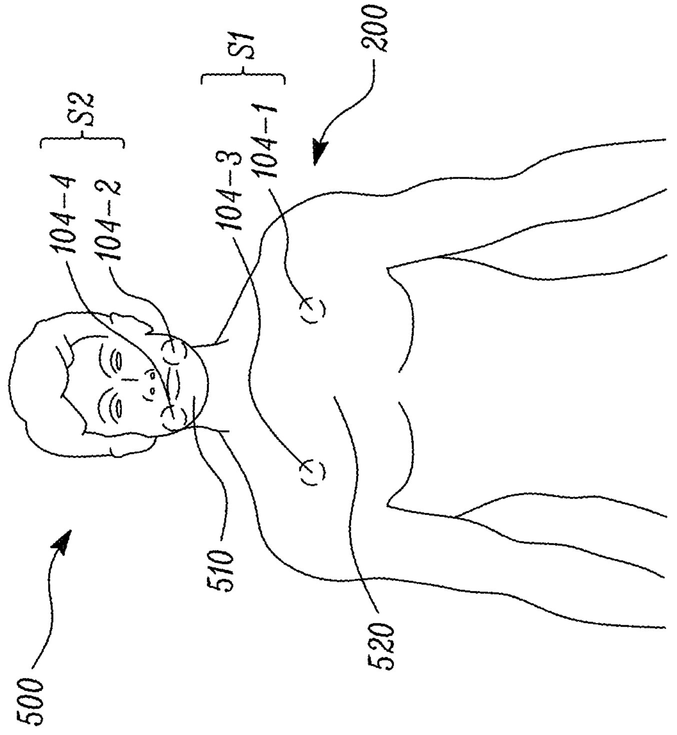
FIGS. 9A and 9B are schematic front and rear views, respectively, of a user.
Figure 9B:
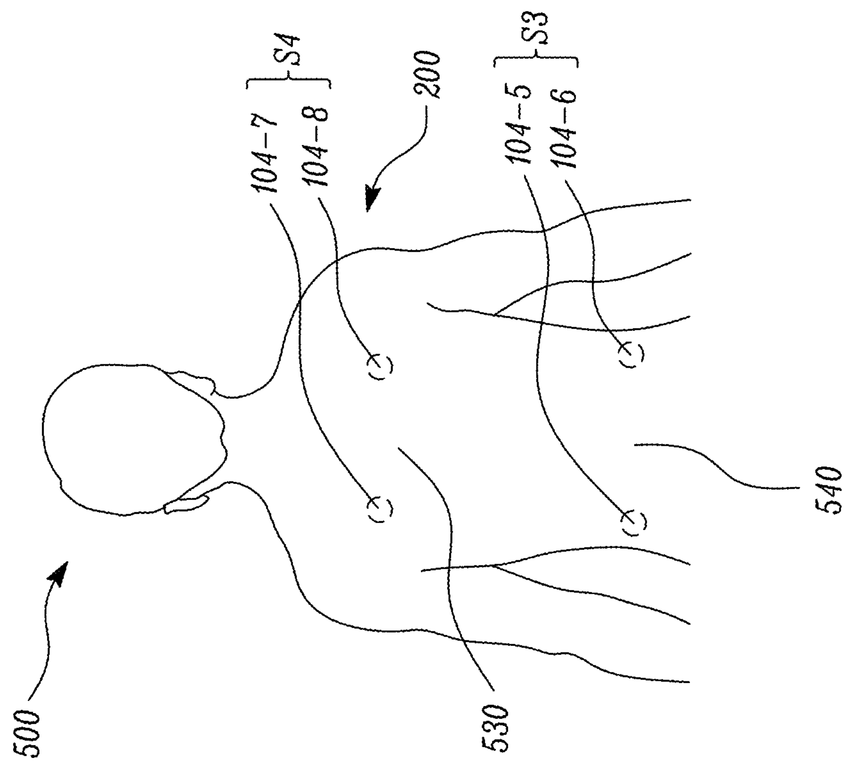

FIGS. 9A and 9B illustrate schematic front and rear views, respectively, of a user 500. The user 500 may be the user of the safety system 200 and the article 102. The user 500 may be a firefighter, a first responder, or any emergency personnel. Only the plurality of tactile actuators 104 of the system 200 are shown in FIGS. 9A and 9B for illustrative purposes.

The user 500 has a face region 510, a chest region 520, a back region 530, and a waist region 540. Each of the face region 510, the chest region 520, the back region 530, and the waist region 540 may have a different degree of sensitivity. For example, the face region 510 may be more sensitive to tactile indications than the chest region 520. Specifically, the chest region 520 may have a first degree of sensitivity S1. Further, the face region 510 may have a second degree of sensitivity S2. The second degree of sensitivity S2 of the face region 510 may be greater than the first degree of sensitivity S1 of the chest region 520.

Furthermore, the back region 530 may be more sensitive to tactile indications than the waist region 540. Specifically, the waist region 540 may have a third degree of sensitivity S3. Further, the back region 530 may have a fourth degree of sensitivity S4. The fourth degree of sensitivity S4 of the back region 530 may be greater than the third degree of sensitivity S3 of the waist region 540. Further, each of the plurality of tactile actuators 104 is associated with a corresponding degree of sensitivity S1, S2, S3, S4 of the user 500.

Referring to FIGS. 2 and 9A, in the illustrated embodiment of FIG. 9A, the first tactile actuator 104-1 and the third tactile actuator 104-3 are associated with the article 102 such that the first and third tactile actuators 104-1, 104-3 at least partially contact the user 500 on the chest region 520. Furthermore, the second tactile actuator 104-2 and the fourth tactile actuator 104-4 are associated with the article 102 such that the second and fourth tactile actuators 104-2, 104-4 at least partially contact the user 500 on the face region 510.

In some embodiments, the controller 108 is configured to provide the first actuating signal 171 to the first tactile actuator 104-1 from the plurality of tactile actuators 104. The first tactile actuator 104-1 is associated with the first degree of sensitivity S1. In some embodiments, the controller 108 is further configured to determine a response of the user after providing the first actuating signal 171 to the first tactile actuator 104-1. In some embodiments, the controller 108 is further configured to provide the second actuating signal 172 to the second tactile actuator 104-2 from the plurality of tactile actuators 104 upon determining that the response of the user to the first actuating signal 171 has the incorrect response. In some embodiments, the second tactile actuator 104-2 is associated with the second degree S2 of sensitivity greater than the first degree of sensitivity S1.

Referring to FIGS. 2 and 9B, in the illustrated embodiment of FIG. 9B, the fifth tactile actuator 104-5 and a sixth tactile actuator 104-6 are associated with the article 102 such that the fifth and sixth tactile actuators 104-5, 104-6 at least partially contact the user 500 on the waist region 540. Furthermore, a seventh tactile actuator 104-7 and an eighth tactile actuator 104-8 are associated with the article 102 such that the seventh and eighth tactile actuators 104-7, 104-8 at least partially contact the user 500 on the back region 530.

In some embodiments, the controller 108 is configured to provide the first actuating signal 171 to the fifth tactile actuator 104-5 from the plurality of tactile actuators 104. The fifth tactile actuator 104-5 is associated with the third degree of sensitivity S3. In some embodiments, the controller 108 is further configured to determine a response of the user after providing the first actuating signal 171 to the fifth tactile actuator 104-5. In some embodiments, the controller 108 is further configured to provide the second actuating signal 172 to the seventh tactile actuator 104-7 from the plurality of tactile actuators 104 upon determining that the response of the user to the first actuating signal 171 has the incorrect response. In some embodiments, the seventh tactile actuator 104-7 is associated with the fourth degree S4 of sensitivity greater than the third degree of sensitivity S3.

Figure 10:
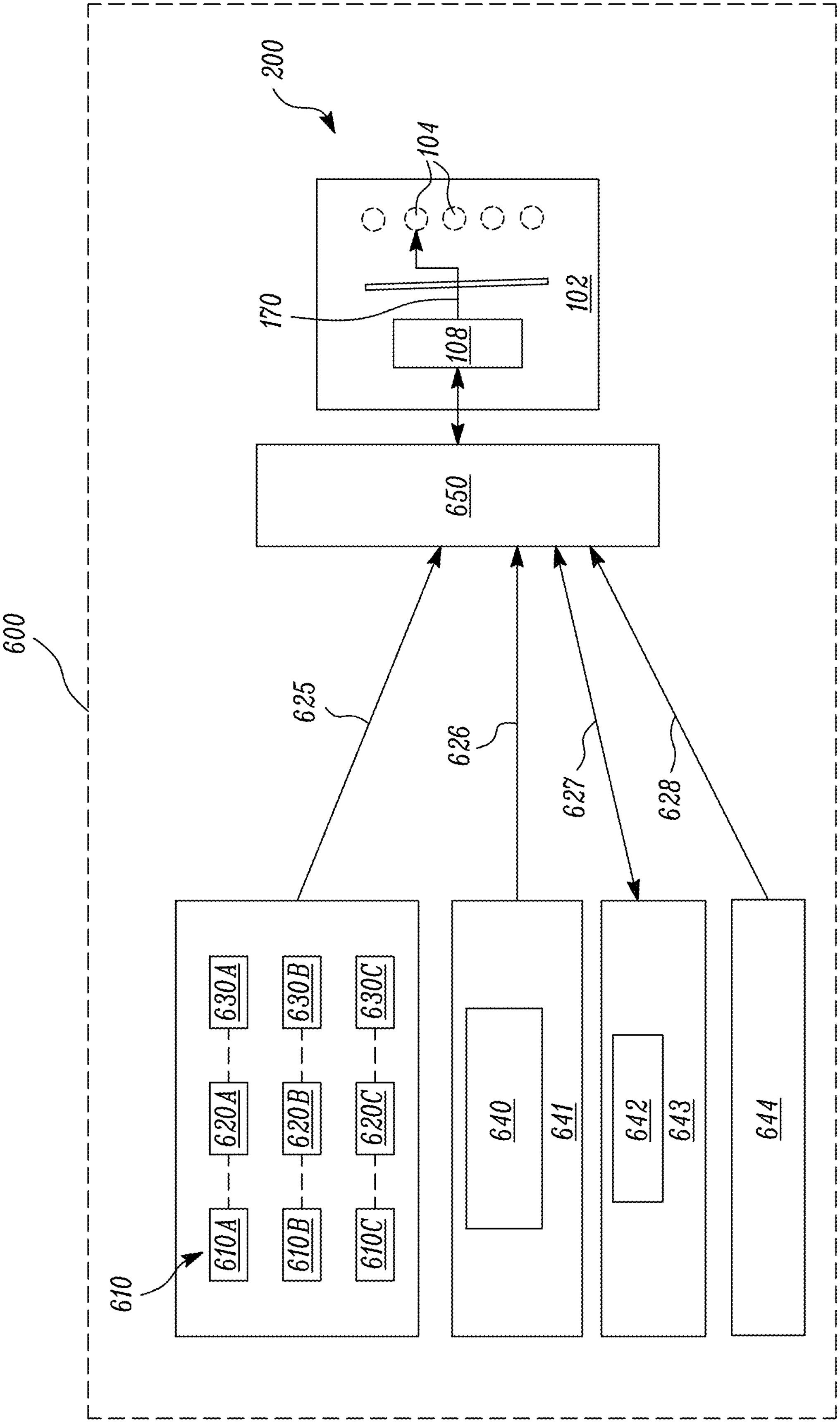
FIG. 10 is a schematic block diagram of a working environment according to an embodiment of the present disclosure.

FIG. 10 illustrates a schematic block diagram of an exemplary working environment 600. In some cases, the working environment 600 may include plurality of sensors 610. Specifically, the working environment 600 includes an electrochemical sensor 610A, a fire sensor 610B, and an infrared (IR) sensor 610C. The working environment 600 further includes a first circuitry 620A, a second circuitry 620B, a third circuitry 620C corresponding to the electrochemical sensor 610A, the fire sensor 610B, and the IR sensor 610C, respectively. The working environment 600 further includes a first transmitter 630A, a second transmitter 630B, and a third transmitter 630C corresponding to the first, second, and third circuitries 620A, 620B, 620C, respectively.

The working environment 600 further includes a communication center 650. The communication center 650 may be communicably and wirelessly coupled to one or more systems via a long range communication. In one example, the long range communication may be established via Bluetooth®. In another example, the long-range communication may be established via a cellular phone network.

The first, second, and third circuitries 620A, 620B, 620C may process data received from the electrochemical, fire, and IR sensors 610A, 610B, 610C. Further, the first, second, and third circuitries 620A, 620B, 620C may provide an alarm signal 625 to the communication center 650 via the respective first, second, and third transmitters 630A, 630B, 630C upon determining a hazardous situation.

The safety system 200 may be used by the user in the working environment 600. As discussed above, the safety system 200 includes the article 102, the plurality of tactile actuators 104 and the controller 108. Further, the communication center 650 may be wirelessly coupled to the controller 108. As shown in FIG. 10, the controller 108 may receive the alarm signal 625. Moreover, the controller 108 may be configured to provide the actuating signal 170 to at least one tactile actuator 104 from the plurality of tactile actuators 104 to actuate the at least one tactile actuator 104 based upon the alarm signal 625 received by the controller 108. Further, the at least one tactile actuator 104 generates the tactile indication upon receiving the actuating signal 170. In one example, the alarm signal 625 may be indicative of a fire event in the working environment 600 detected by the data received from the fire sensor 610B and processed by the second circuitry 620B.

In some cases, the communication center 650 may be communicably coupled with a system 640 used by a commanding officer 641. The commanding officer 641 may provide instructions using the system 640 to the user using the safety system 200. The commanding officer 641 may provide an instruction signal 626 to the communication center 650. Furthermore, the controller 108 may receive the instruction signal 626 from the communication center 650. In some cases, the instruction signal 626 may be indicative of a search command. In some cases, the instruction signal 626 may be indicative of an exit command or an evacuation command. The controller 108 may be configured to provide the actuating signal 170 to at least one tactile actuator 104 from the plurality of tactile actuators 104 to actuate the at least one tactile actuator 104 based upon the instruction signal 626 received by the controller 108. Further, the at least one tactile actuator 104 generates the tactile indication upon receiving the actuating signal 170.

Furthermore, the communication center 650 may be communicably coupled with a PASS device 642 used by an emergency personnel 643. The emergency personnel 643 may provide alarm signals using the PASS device 642 to the user using the safety system 200. Specifically, the emergency personnel 643 may provide an alarm signal 627 to the communication center 650. The alarm signal 627 may be indicative of a man-down situation. Furthermore, the controller 108 may receive the alarm signal 627 from the communication center 650. Moreover, the controller 108 may be configured to provide the actuating signal 170 to at least one tactile actuator 104 from the plurality of tactile actuators 104 to actuate the at least one tactile actuator 104 based upon the alarm signal 627 received by the controller 108. Further, the at least one tactile actuator 104 generates the tactile indication upon receiving the actuating signal 170. In some cases, the controller 108 may provide a response to the communication center 650 upon receiving the alarm signal 627. The communication center 650 may provide the response back to the PASS device 642.

In some cases, the working environment 600 further includes a smart building 644. The smart building 644 may be communicably coupled with the communication center 650. The smart building 644 may provide a signal 628 to the communication center 650. The signal 628 may include information, such as navigation instructions, to locate a place inside the smart building 644. For example, upon determining that the place in the smart building 644 has an ongoing fire event, the smart building 644 may provide the signal 628 to the communication center 650. The controller 108 may receive the signal 628 from the communication center 650 and provide the actuating signal 170 based on the signal 628 to the at least one tactile actuator 104 to actuate the at least one tactile actuator 104. The actuating signal 170 may provide navigation instructions to the user directing the user to the place in the smart building 644.

In some cases, the working environment 600 may have a release preplan. The plurality of sensors 610 may detect an emergency situation and provide emergency information regarding the emergency situation to the controller 108 via the communication center 650. In some examples, the emergency information may include a location where the emergency situation is detected. The controller 108 may provide the instructions to the user of the safety system 200 via the tactile indication to direct the user to the location of the emergency situation. Furthermore, the preplan may include predefined exits. In some cases, where equipment of the user malfunctions, the user may actuate a mayday button. The controller 108 may provide directions to the predefined exits nearest to the user via the tactile indications. Directions to the predefined exits may be particularly useful when vision of the user is compromised due to the emergency situation.

Figure 11:
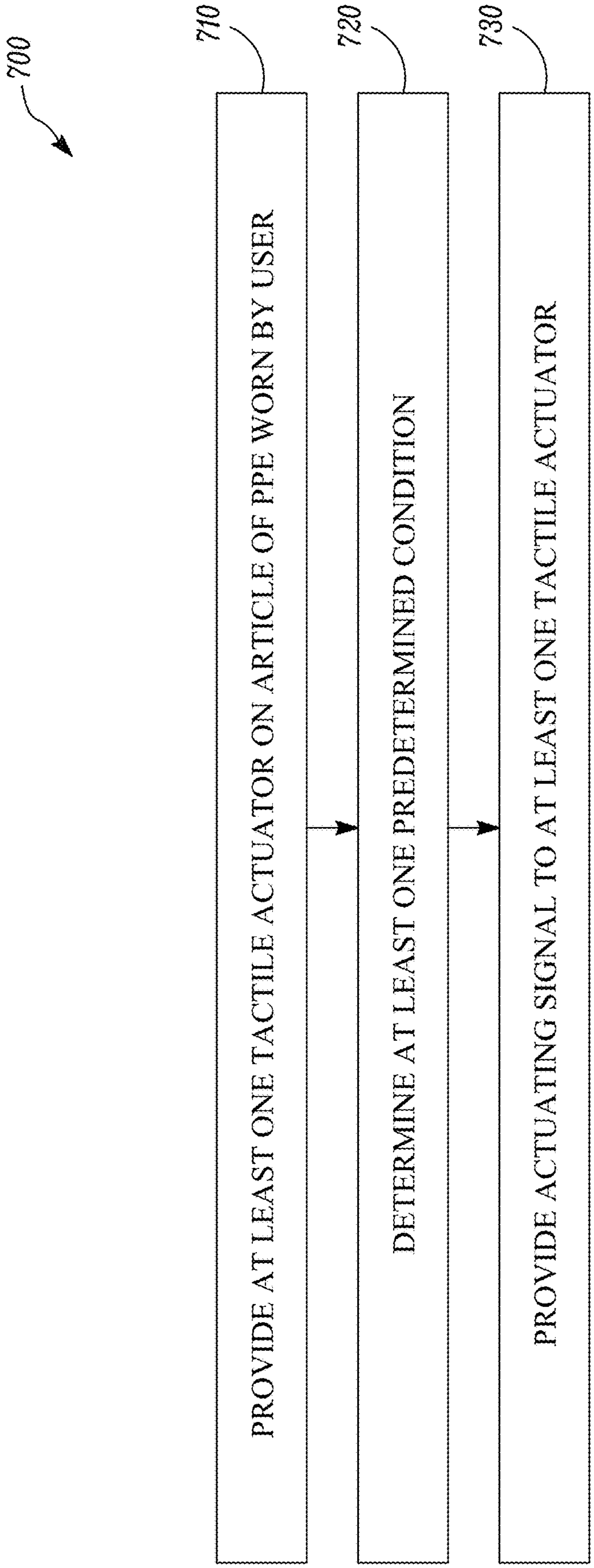
FIG. 11 is a flowchart illustrating various steps of a method of generating a tactile indication according to an embodiment of the present disclosure.
Figure 12B:
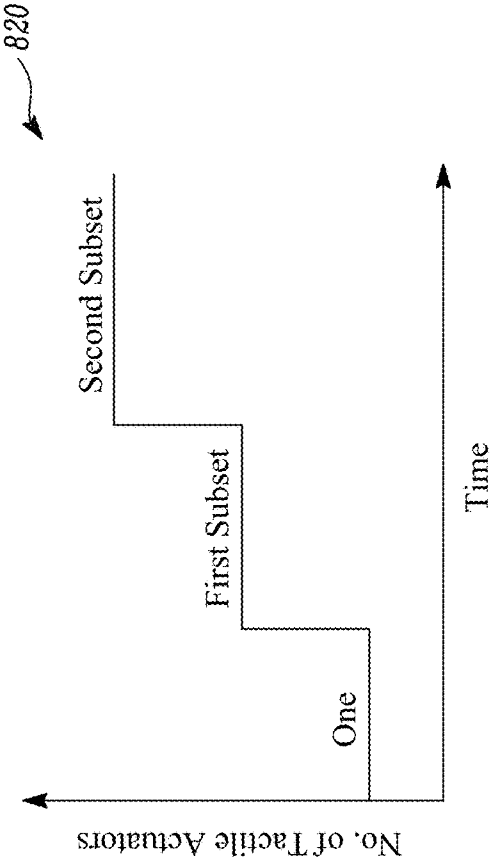
FIGS. 12A, 12B, and 12C illustrate exemplary variations of a number of tactile actuators actuating with respect to time.
Figure 12A:
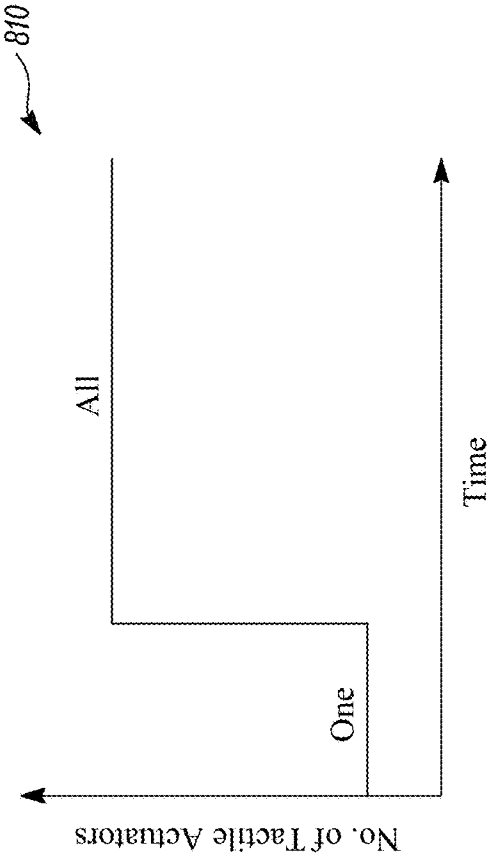
Figure 12C:
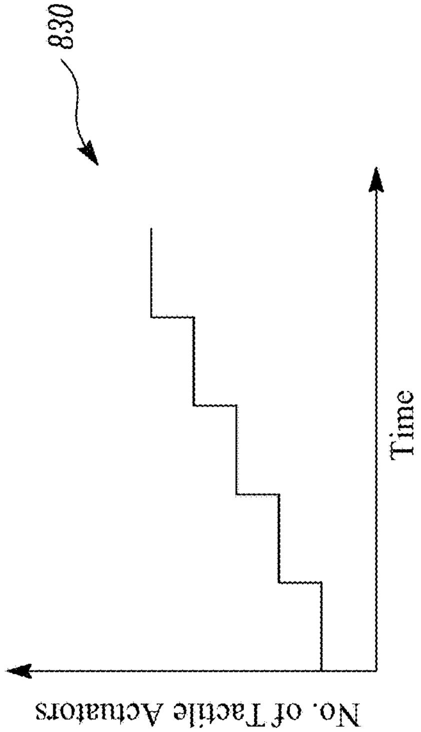

FIG. 11 illustrates a method 700 of generating the tactile indication. The method 700 may be performed by the safety systems 100, 200 of the present disclosure. In some embodiments, steps involved in the method 700 may be executed by a processing resource, for example, the controller 108, based on instructions stored in a non-transitory computer-readable medium. FIGS. 12A, 12B, and 12C illustrate graphs 810, 820, 830, respectively, depicting exemplary variations of a number of tactile actuators actuating with respect to time. The method 700 will be described with reference to FIGS. 1-12C. As discussed above, the article 102 may be worn by the user while working or operating in the working environment. The method 700 includes the following steps:

At step 710, the method 700 includes providing the at least one tactile actuator 104 on the article 102 worn by the user.

At step 720, the method 700 further includes determining the at least one predetermined condition.

In some embodiments, the method 700 further includes receiving, by the controller 108, the input signal 150 from the at least one sensor 110. In some embodiments, the method 700 further includes determining, by the controller 108, the at least one predetermined condition based on the input signal 150.

In some embodiments, the method 700 further includes monitoring, by the at least one sensor 110, the parameter associated with the article 102. In some embodiments, the parameter includes at least one of the fluid pressure within the cylinder and the battery charge of the battery module.

In some embodiments, the method 700 further includes monitoring, by the at least one sensor 110, the environment parameter of the working environment of the user. In some embodiments, the environment parameter includes at least one of the ambient temperature of the working environment and the concentration of the hazardous gas in the working environment.

At step 730, the method 700 further includes providing, by the controller 108, the actuating signal 170 to the at least one tactile actuator 104 to actuate the at least one tactile actuator 104 upon determining the at least one predetermined condition. Further, the at least one tactile actuator 104 generates the tactile indication upon receiving the actuating signal 170.

Referring to FIGS. 2, 4A-4C, and 11, in some embodiments, the method 700 further includes, prior to providing the actuating signal 170 to the at least one tactile actuator 104, selecting the intensity 402, the total time duration 404, and the frequency 408 of the tactile indication.

Referring to FIGS. 2, 9A, 9B, and 11, in some embodiments, the at least one tactile actuator 104 includes the plurality of tactile actuators 104 spaced apart from each other. In some embodiments, each of the plurality of tactile actuators 104 is associated with the corresponding degree of sensitivity S1, S2, S3, S4 of the user.

In some embodiments, providing the actuating signal 170 to the at least one tactile actuator 104 further includes providing the first actuating signal 171 to the first tactile actuator 104-1 from the plurality of tactile actuators 104.

Referring to FIGS. 2, 9A, and 11, in some embodiments, the first tactile actuator 104-1 is associated with the first degree of sensitivity S1. In some embodiments, providing the actuating signal 170 to the at least one tactile actuator 104 further includes determining the response of the user after providing the first actuating signal 171 to the first tactile actuator 104-1. In some embodiments, providing the actuating signal 170 to the at least one tactile actuator 104 further includes providing the second actuating signal 172 to the second tactile actuator 104-2 from the plurality of tactile actuators 104 upon determining that the response of the user to the first actuating signal 171 includes the incorrect response. In some embodiments, the second tactile actuator 104-2 is associated with the second degree of sensitivity S2 greater than the first degree of sensitivity S1.

Referring to FIGS. 2, 11, and 12A, in some embodiments, providing the actuating signal 170 to the at least one tactile actuator 104 further includes providing the first actuating signal 171 to the first tactile actuator 104-1 from the plurality of tactile actuators 104 to generate the first tactile indication. In some embodiments, providing the actuating signal 170 to the at least one tactile actuator 104 further includes determining the response of the user to the first tactile indication. In some embodiments, providing the actuating signal 170 to the at least one tactile actuator 104 further includes providing the second actuating signal 172 to each of the plurality of tactile actuators 104 to generate the second tactile indication upon determining that the response of the user to the first tactile indication includes the incorrect response.

Referring to FIGS. 2, 4A-4C, and 11, in some embodiments, providing the actuating signal 170 to the at least one tactile actuator 104 further includes providing the first actuating signal 171 to each of the plurality of tactile actuators 104 to generate the first tactile indication. In some embodiments, the first tactile indication includes the first intensity 402A, the first time duration 404A, and the first frequency 408A. In some embodiments, providing the actuating signal 170 to the at least one tactile actuator 104 further includes determining the response of the user after providing the first actuating signal 171. In some embodiments, providing the actuating signal 170 to the at least one tactile actuator 104 further includes providing the second actuating signal 172 to each of the plurality of tactile actuators 104 to generate the second tactile indication upon determining the incorrect response of the user to the first actuating signal 171. In some embodiments, the second tactile indication includes the second intensity 402B, the second time duration 404B, and the second frequency 408B. In some embodiments, the at least one of the second intensity 402B, the second time duration 404B, and the second frequency 408B is greater than at least one of the corresponding first intensity 402A, first time duration 404A, and first frequency 408A.

In some embodiments, the method 700 further includes receiving, by the controller 108, the navigation instruction 113. In some embodiments, the actuating signal 170 is provided to the at least one tactile actuator 104 further based on the navigation instruction 113. Referring to FIGS. 2, 11, and 12B, in some embodiments, the method further includes actuating only a subset (e.g., first subset or second subset shown in FIG. 12B) of the plurality of tactile actuators 104 to indicate the direction based on the navigation instruction 113. Referring to FIGS. 2, 11, and 12A, in some embodiments, the method 700 further includes simultaneously actuating each of the plurality of tactile actuators 104 upon determining the incorrect response of the user to the navigation instruction 113.

In some embodiments, the at least one predetermined condition includes the remaining value of the parameter associated with the article 102. Referring to FIGS. 2, 3C, 11, and 12C, in some embodiments, the method 700 further includes progressively actuating the increasing number of the plurality of tactile actuators 104 based on the decrease in the remaining value of the parameter. In some embodiments, the parameter includes at least one of the fluid pressure within the cylinder and the battery charge of the battery module.

In some embodiments, the at least one predetermined condition includes at least one of the ambient temperature of the working environment exceeding the threshold temperature, reduction of the fluid pressure within the cylinder below the threshold pressure level, reduction of the battery charge of the battery module below the threshold charge level, detection of the hazardous situation in the working environment, and the alert signal from the external device.

The safety systems 100, 200 of the present disclosure may provide the tactile indication to the user 500 via the plurality of tactile actuators 104. Furthermore, the method 700 of the present disclosure may be used to generate the tactile indication. The tactile indication may provide the operational and the assistive indications to the user 500. The operational and the assistive indications may be indicative of safety related events, and navigation in the working environment 600. In some cases, the tactile indication includes the pulsed signal 400. Further, the pulsed signal 400 may include a combination of different types of vibrations and haptic effects regulated by the controller 108. Each type of vibration may be indicative of a specific predetermined condition. In some cases, each type of vibration may be indicative of an alert related to a specific message type, a notification type, and a priority of instruction.

The tactile indication provided by the safety systems 100, 200 and generated by the method 700 of the present disclosure may allow the user 500 to receive the messages, notifications, and instructions even when the visual and audio senses of the user 500 are preoccupied. Therefore, the safety systems 100, 200 of the present disclosure may provide improved situational awareness to the user 500 in the working environment 600.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A safety system for a user, the safety system comprising:

an article of personal protective equipment (PPE) configured to be at least partially in contact with the user;

at least one tactile actuator associated with the article of PPE, wherein the at least one tactile actuator is configured to provide tactile stimulation to the user, wherein the at least one tactile actuator comprises a plurality of tactile actuators spaced apart from each other and communicably coupled to the controller; and a controller communicably coupled to the at least one tactile actuator, wherein the controller is configured to provide an actuating signal to the at least one tactile actuator to actuate the at least one tactile actuator based upon at least one predetermined condition, and wherein the at least one tactile actuator generates a tactile indication upon receiving the actuating signal, wherein the article of PPE comprises at least one soft portion at least partially disposed in contact with the user and at least one hard portion at least partially disposed in contact with the user, wherein a first elastic modulus of the at least one soft portion is less than a second elastic modulus of the at least one hard portion, and wherein the plurality of tactile actuators comprises a first set of tactile actuators associated with the at least one soft portion and a second set of tactile actuators associated with the at least one hard portion.

2. The safety system of claim 1, wherein the at least one predetermined condition comprises a remaining value of a parameter associated with the article of PPE, and wherein the controller is further configured to progressively actuate an increasing number of the plurality of tactile actuators based on a decrease in the remaining value of the parameter.

3. The safety system of claim 2, wherein the parameter comprises at least one of a fluid pressure within a cylinder and a battery charge of a battery module.

4. The safety system of claim 1, wherein the at least one soft portion of the article of PPE comprises one or more of a shoulder strap and a waist belt, and wherein the at least one hard portion of the article of PPE comprises a back frame.

5. The safety system of claim 1, further comprising a first set of electrical connections electrically connecting the first set of tactile actuators to the controller and a second set of electrical connections electrically connecting the second set of tactile actuators to the controller.

6. The safety system of claim 1, further comprising a power source configured to supply an electrical power to the at least one tactile actuator.

7. The safety system of claim 6, wherein the controller is communicably coupled to the power source, and wherein the controller is further configured to control the electrical power supplied to the at least one tactile actuator.

8. The safety system of claim 1, wherein the article of PPE comprises at least one contact region disposed in direct contact with the user, and wherein the at least one tactile actuator is associated with the at least one contact region.

9. The safety system of claim 8, wherein the at least one contact region comprises a shoulder portion, a back portion, a waist portion, a chest portion, a facemask portion, a housing portion, and a device portion.

10. The safety system of claim 8, wherein the article of PPE comprises a harness comprising at least one of a shoulder strap, a back strap, a waist strap, and a chest strap, and wherein the at least one contact region comprises at least one of the shoulder strap, the back strap, the waist strap, and the chest strap.

11. The safety system of claim 1, wherein the article of PPE comprises at least one of a self-contained breathing apparatus, a powered air-purifying respirator, a personal alert safety device, a harness, a full facemask, a half facemask, a belt, and an article of clothing.

12. The safety system of claim 1, further comprising at least one sensor communicably coupled to the controller, wherein the controller is further configured to:

receive an input signal from the at least one sensor indicative of the at least one predetermined condition; and provide the actuating signal to the at least one tactile actuator to generate the tactile indication based on the at least one predetermined condition.

13. The safety system of claim 12, wherein the controller is wirelessly coupled to the at least one sensor.

14. The safety system of claim 1, wherein each of the plurality of tactile actuators being associated with a corresponding degree of sensitivity of the user, and wherein the controller is further configured to:

provide a first actuating signal to a first tactile actuator from the plurality of tactile actuators, wherein the first tactile actuator is associated with a first degree of sensitivity;

determine a response of the user after providing the first actuating signal to the first tactile actuator; and provide a second actuating signal to a second tactile actuator from the plurality of tactile actuators upon determining that the response of the user to the first actuating signal comprises an incorrect response, wherein the second tactile actuator is associated with a second degree of sensitivity greater than the first degree of sensitivity.

15. The safety system of claim 1, wherein the controller is further configured to:

provide a first actuating signal to a first tactile actuator from the plurality of tactile actuators to generate a first tactile indication;

determine a response of the user to the first tactile indication; and provide a second actuating signal to each of the plurality of tactile actuators to generate a second tactile indication upon determining that the response of the user to the first tactile indication comprises an incorrect response.

16. The safety system of claim 1, wherein the controller is further configured to:

provide a first actuating signal to each of the plurality of tactile actuators to generate a first tactile indication, the first tactile indication comprising a first intensity, a first time duration, and a first frequency;

determine a response of the user after providing the first actuating signal; and provide a second actuating signal to each of the plurality of tactile actuators to generate a second tactile indication upon determining an incorrect response of the user to the first actuating signal, wherein the second tactile indication comprises a second intensity, a second time duration, and a second frequency, and wherein at least one of the second intensity, the second time duration, and the second frequency is greater than at least one of the corresponding first intensity, first time duration, and first frequency.

17. A safety system for a user, the safety system comprising:

an article of personal protective equipment (PPE) configured to be at least partially in contact with the user;

at least one tactile actuator associated with the article of PPE, wherein the at least one tactile actuator is configured to provide tactile stimulation to the user; and a controller communicably coupled to the at least one tactile actuator, wherein the controller is configured to provide an actuating signal to the at least one tactile actuator to actuate the at least one tactile actuator based upon at least one predetermined condition, and wherein the at least one tactile actuator generates a tactile indication upon receiving the actuating signal, wherein the at least one predetermined condition comprises a remaining value of a parameter associated with the article of PPE, and wherein the controller is further configured to progressively actuate an increasing number of the plurality of tactile actuators based on a decrease in the remaining value of the parameter.

18. The safety system of claim 17, wherein the parameter comprises at least one of a fluid pressure within a cylinder and a battery charge of a battery module.

19. A safety system for a user, the safety system comprising:

an article of personal protective equipment (PPE) configured to be at least partially in contact with the user;

at least one tactile actuator associated with the article of PPE, wherein the at least one tactile actuator is configured to provide tactile stimulation to the user, wherein the at least one tactile actuator comprises a plurality of tactile actuators spaced apart from each other and communicably coupled to the controller; and a controller communicably coupled to the at least one tactile actuator, wherein the controller is configured to provide an actuating signal to the at least one tactile actuator to actuate the at least one tactile actuator based upon at least one predetermined condition, and wherein the at least one tactile actuator generates a tactile indication upon receiving the actuating signal, wherein the article of PPE comprises at least one soft portion at least partially disposed in contact with the user and at least one hard portion at least partially disposed in contact with the user, wherein the controller is further configured to:

provide a first actuating signal to each of the plurality of tactile actuators to generate a first tactile indication, the first tactile indication comprising a first intensity, a first time duration, and a first frequency;

determine a response of the user after providing the first actuating signal; and provide a second actuating signal to each of the plurality of tactile actuators to generate a second tactile indication upon determining an incorrect response of the user to the first actuating signal, wherein the second tactile indication comprises a second intensity, a second time duration, and a second frequency, and wherein at least one of the second intensity, the second time duration, and the second frequency is greater than at least one of the corresponding first intensity, first time duration, and first frequency.

* * * * *